US006845291B2

(12) United States Patent
Tahira et al.

(10) Patent No.: US 6,845,291 B2
(45) Date of Patent: Jan. 18, 2005

(54) DEVICE FOR STOCKING/EXTRACTING PART

(75) Inventors: Hiroki Tahira, Sayama (JP); Kazutoshi Takada, Sayama (JP); Tetsuo Sugizono, Sayama (JP); Katsumune Inaki, Sayama (JP); Masao Nitta, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/416,734

(22) PCT Filed: Oct. 19, 2001

(86) PCT No.: PCT/JP01/09197

§ 371 (c)(1), (2), (4) Date: Jul. 14, 2003

(87) PCT Pub. No.: WO02/40214

PCT Pub. Date: May 23, 2002

(65) Prior Publication Data

US 2004/0059461 A1 Mar. 25, 2004

(30) Foreign Application Priority Data

Nov. 14, 2000 (JP) .................................... 2000-346698
Nov. 14, 2000 (JP) .................................... 2000-346700

(51) Int. Cl.[7] ............................ G06F 7/00; B65G 1/00
(52) U.S. Cl. ................. 700/214; 700/218; 414/331.05
(58) Field of Search ............................. 700/213, 214, 700/218, 220; 414/331.05; 221/104, 120

(56) References Cited

U.S. PATENT DOCUMENTS 5,546,315 A * 8/1996 Kleinschnitz ............... 700/218
6,357,984 B1 * 3/2002 Zinger et al. .......... 414/331.05
6,669,432 B2 * 12/2003 Hamel et al. .......... 414/331.05
6,714,490 B2 * 3/2004 Ostwald .................... 369/30.5
6,728,597 B2 * 4/2004 Didriksen et al. .......... 700/214

FOREIGN PATENT DOCUMENTS

| JP | 56-071851 A | 6/1981 |
|---|---|---|
| JP | 61-082910 A | 4/1986 |
| JP | 01-236103 A | 9/1989 |
| JP | 05-069906 A | 3/1993 |
| JP | 06-321320 A | 11/1994 |
| JP | 09-272611 A | 10/1997 |
| JP | 09-315520 A | 12/1997 |
| JP | 10-169719 A | 6/1998 |
| JP | 11-250131 A | 9/1999 |
| JP | 2000-205344 A | 7/2000 |

* cited by examiner

Primary Examiner—Gene O. Crawford
(74) Attorney, Agent, or Firm—Birch, Stewart, Kolasch & Birch, LLP

(57) ABSTRACT

A part housing or extracting apparatus is here disclosed which comprises a housing shelf which has a plurality of cylindrical bodies coaxially laminated in a vertical direction and equipped with at least one stage of a part housing unit the peripheral edge of which is partitioned into many columns so that the outer peripheral edge surface of the part housing unit may be opened, the respective cylindrical bodies being independently rotatable; at least one part housing or conveying means which has first part holding means disposed opposite to the outer peripheral surface of the housing shelf so that the part held by the first part holding means may be conveyed to a predetermined part housing unit and then housed therein; and at least one part extracting or conveying means which has second part holding means disposed opposite to the outer peripheral surface of the housing shelf so that the part housed in the predetermined part housing unit may be held and extracted by the second part holding means and then conveyed to a predetermined position; the respective cylindrical bodies and the respective part holding means being relatively movable along the outer peripheral surface of the housing shelf.

14 Claims, 16 Drawing Sheets

DEVICE FOR STOCKING/EXTRACTING PART

This application is the national phase under 35 U.S.C. §371 of PCT International Application No. PCT/JP01/09197 which has an International filing date of Oct. 19, 2001, which designated the United States of America.

FIELD OF THE INVENTION

The present invention relates to a part housing or extracting apparatus that houses a part at a predetermined position or extracts the part housed at the predetermined position. More particularly, it relates to a part housing or extracting apparatus used in assembling a product comprising a plurality of parts such as elastic rings, for example, endless stripe metal rings that constitute a belt for a continuously variable transmission (CVT).

BACKGROUND ART

For example, a belt for a continuously variable transmission (CVT) used as a transmission of an automobile is composed of a laminated ring in which a plurality of endless stripe metal rings are laminated and assembled in their thickness direction. The laminated ring of this type is laminated by selecting metal rings of each layer manufactured individually so that its circumferential value or radius will basically be a design value (this value mutually differs for each layer) and assembling them. Subsequently, this work is repeated only for the necessary number of laminated rings.

However, a metal ring that constitutes each layer of the laminated ring is manufactured so that its circumferential value or radius will basically be a design value, but it does not always match the design value at high accuracy. In general, a certain degree of dispersion occurs around the design value due to a production error. Accordingly, when the metal ring of each layer is combined and laminated, a desired laminated ring cannot always be obtained even if the metal ring of each layer is selected and combined arbitrarily (at random) one by one.

Hereupon, to assemble the laminated ring, after the metal ring of each layer is manufactured, size data, such as circumferential values of metal rings are measured separately, and each metal ring is stored in a part housing shelf in connection with measurement data. Further, the metal ring of each layer is selected and extracted individually from the part housing shelf in accordance with combination conditions preset for selecting and combining the metal ring of each layer.

As a part housing or extracting apparatus that houses a part, such as the metal ring, in the part housing shelf or extracts the housed part, for example, the part housing or extracting apparatus described in Japanese Patent Laid-Open Publication No. 61-131845 and Japanese Patent Laid-Open Publication No. 6-321320 is known. The part housing or extracting apparatus described in each of the Japanese Patent Publications is provided with a freely rotating housing shelf having a part housing unit defined by partitioning a peripheral edge of a cylindrical body into many stages and many columns and of which the end face of the outer peripheral edge surface is opened and part conveying means secured and provided at the position fronting on the external surface of the housing shelf. Further, the part conveying means is provided with a part holding member that freely moves along the external surface of the housing shelf in the vertical direction. Accordingly, the part housing or extracting apparatus holds a part, such as the metal ring, by the part holding member and can house it in the part housing unit or can extract the part housed in the part housing unit.

However, because the part housing or extracting apparatus performs both operations of the housing or extracting of a part by fixed part conveying means, it takes time for the housing or extracting of the part and improvement is desired.

DISCLOSURE OF THE INVENTION

An object of the present invention is to provide a part housing or extracting apparatus that can quickly perform the housing or extracting of a part by obviating such inconveniences.

Hence, a first aspect of the present invention is directed to a part housing or extracting apparatus comprising a housing shelf which has a plurality of cylindrical bodies coaxially laminated in a vertical direction and equipped with at least one stage of a part housing unit, the peripheral edge of which is partitioned into many columns so that the outer peripheral edge surface of the part housing unit may be opened, the respective cylindrical bodies being independently rotatable, at least one part housing or conveying means which has first part holding means for holding a part disposed opposite to the outer peripheral surface of the housing shelf, and conveying the part held by the first part holding means to a predetermined part housing unit and then housing therein, and at least one part extracting or conveying means which has second part holding means for holding the part disposed opposite to the outer peripheral surface of the housing shelf, and holding and extracting the part housed in the predetermined part housing unit by the second part housing means and then conveying to a predetermined position, the respective cylindrical bodies and the respective part holding means being relatively movable along the outer peripheral surface of the housing shelf, wherein the part is an elastic ring and is used to form a laminated ring by mutually laminating the rings in accordance with a predetermined condition, the part housing unit comprises a plurality of pairs of first holding members oppositely arranged at predetermined intervals, each pair of the first holding members are mutually arranged in columns at predetermined intervals and held from the outer peripheral edge surface of the ring in a condition where the ring is bent, both the part holding means further comprise a pair of arm members oppositely arranged at predetermined intervals, advance or retreat means for advancing or retreating the arm members to and from the part housing unit, a plurality of pairs of clasp members oppositely disposed in the arm members at predetermined intervals along the lengthwise direction of the arm members, and expanding or shortening means for expanding or shortening the intervals of the clasp members, when the arm members are advanced into the part housing unit by the advance or retreat means, the first holding members are arranged so as to be positioned between the clasp members, and the expanding or shortening means reduces the intervals of the clasp members advanced into the part housing unit so as to be narrower than the intervals of the first holding members and clasps the ring from the outer peripheral edge surface or enlarges the intervals of the clasp members so as to be wider than the intervals of the first holding members, thereby releasing the clasp of the ring.

According to the part housing or extracting apparatus of the present invention, a plurality of cylindrical bodies are independently provided individually so as to freely rotate and a housing shelf is formed. Accordingly, to house the part, any one of the cylindrical bodies and the part housing or conveying means are relatively moved along the external surface of the housing shelf, and the part housing or conveying means fronts on a part housing unit that should house the part of the cylindrical body. Subsequently, a part held by first part holding means is housed in the part housing unit.

Further, to extract the part, any one of the cylindrical bodies and the part extracting or conveying means are relatively moved along the external surface of the housing shelf and the part extracting or conveying means fronts on a part housing unit that houses the part to be extracted of the cylindrical bodies. Subsequently, second part holding means holds the part and extracts it from the part housing unit.

Accordingly, the part housing or extracting apparatus of the present invention can independently perform the housing or extracting of the part respectively and can shorten the time required for the housing or extracting of the part.

In the part housing or extracting apparatus, the ring is repelled, hooked, and held in the first holding members at the outer peripheral edge surface of the ring in a condition in which the ring is being bent by the elasticity. On the other hand, both the first and second part holding means are held by repelling and hooking the outer peripheral edge surface of the ring with the insertion members in a condition in which the ring is being bent by the elasticity.

Thereupon, the first part holding means makes the intervals of the insertion members provided in opposition via the arm members narrower than the intervals of the first holding members provided in opposition and is made to advance into the part housing unit by the advance or retreat means in a condition in which the ring is being held. Further, the expanding and shortening means makes the intervals of the insertion members wider than the interval of the first holding member via the arm members. As a result, the insertion of the ring is released using the insertion members, and the ring is held using the first holding member instead. Subsequently, the first part holding means completes the housing of the ring by being made to retreat from the part housing unit by the advance or retreat means in a condition in which the intervals of the insertion members are made wider than the interval of the first holding member as is.

Further, the second part holding means is made to advance into the part housing unit by the advance or retreat means in a condition in which the intervals of the insertion members arranged in opposition via the arm members is made wider than the interval of the first holding member arranged in opposition. Further, the expanding or shortening means makes the intervals of the insertion members narrower than the interval of the first holding member via the arm members. As a result, the ring is bent further than a condition in which it is held in the first holding member, and transferred and inserted to the insertion members. Subsequently, the second part holding means extracts the ring by being made to retreat from the part housing unit by the advance or retreat means in a condition in which the intervals of the insertion members are made smaller than the interval of the first holding member and the ring is inserted and held in the insertion members as is.

Consequently, according to the par housing or extracting apparatus, because a ring held in the first holding member is inserted using insertion members only by advancing or retreating the part holding means by the advance or retreat means and expanding or shortening the intervals of the insertion members by the expanding or shortening means or the ring can be held in the first insertion member by releasing the insertion using the insertion members, the part housing or extracting apparatus can easily perform the housing or extracting of the ring.

Besides, when both the part holding means are made to advance into the part housing unit by the advance or retreat means, the first holding member is arranged so as to be positioned between the insertion members. Accordingly, the first holding member and the insertion members will not interfere mutually and expanding or shortening operation can be performed by the expanding or shortening means.

Furthermore, a second aspect of the present invention is directed to a part housing or extracting apparatus further comprising an inventory memory for storing presence/absence of inventory of the part in each part housing unit, a housing data memory for storing inherent data of the part in connection with a position in the housing shelf of the part housing unit wherein the part is housed, and a housing or extracting controller for controlling a housing operation of directing the first part holding means to the empty part housing unit stored by the inventory memory and housing the part in the part housing unit by the first part holding means, and an extracting operation of directing the second part holding means to the part housing unit housing the part to be extracted stored in the housing data memory and holding and then extracting the part from the part housing unit by the second part holding means.

In the part housing or extracting apparatus, when the part is housed in the housing shelf, the housing or extracting controller allows the first part holding means that holds the part to front on an empty part housing unit the inventory memory stores and houses the part in the part housing unit by the first part holding means. At this time, the inventory memory stores the part housing unit that houses the part as being in stock, and the housing data memory stores the inherent data of the part in connection with the position in the housing shelf of the part housing unit that houses the part.

Subsequently, to extract the part from the housing shelf, the housing or extracting controller selects a part provided with the optimum inherent data in accordance with preset conditions from the parts stored by the housing data memory and allows the part holding means to front on the part housing unit stored in connection with the inherent data. Further, the selected part provided with the optimum inherent data is held by the second part holding means and extracted from the part housing unit. At this time, the inventory memory stores the part housing unit from which the part is extracted as an empty part housing unit.

Accordingly, the part housing or extracting apparatus can smoothly perform the housing or extracting of the ring when the housing or extracting controller allows the first part holding means and the second part holding means to front on the part housing unit respectively using the data stored in the inventory memory and the housing data memory.

However, the part housing and extracting apparatus cannot smoothly perform the housing or extracting of the part if a state of the housing shelf and an actual state of the housing shelf the inventory memory and the housing data memory store differ for the reason that an operator manually houses or extracts the part instead of the first or second part holding means or housing operation by the first part holding means or extracting operation by the second part holding means was unsuccessful.

Hence, a third aspect of the present invention is directed to a part housing or extracting apparatus wherein the first part holding means comprises a first sensor for detecting presence/absence of the part in the part housing unit when it fronts on the part housing unit, and a second sensor for detecting the holding of the part, the housing or extracting controller comprises subsequent candidate position setting means for setting the position of an empty part housing unit of a subsequent candidate stored in the inventory memory to allow the first part holding means to front on the empty part housing unit of the subsequent candidate, when the first part holding means is allowed to front on the empty part housing unit of a first candidate stored in the inventory memory by the housing operation, and when the part is detected in the empty part housing unit of the first candidate by the first sensor, error deciding means for detecting presence/absence of the part held by the first part holding means with the aid of a second sensor after the end of the housing operation to decide presence/absence of an error in the housing operation, and stopping means for stopping each operation when it is decided by the error deciding means that the error is present.

When the part is housed in the housing shelf by the part housing or extracting apparatus, first, the housing or extracting controller allows the first part holding means to front on an empty part housing unit of a first candidate the inventory memory stores. The part housing unit is empty according to the storage of the inventory memory, but it may actually house the part for the reason that an operator manually houses the part instead of the first part holding means or extracting operation was unsuccessful by the second part holding means.

Thereupon, subsequently, the part housing or extracting apparatus detects the presence of the part inside the first housing unit by a first sensor when the first part holding means fronts on the part housing unit. Further, if the part is not detected in the part housing unit by the first sensor, the housing or extracting controller houses the part in an empty housing unit of a first candidate by the first part holding means as is and terminates housing operation.

On the other hand, when the part is detected in the part housing unit by a first sensor, the housing or extracting controller newly sets the position of an empty part housing unit of a subsequent candidate the inventory memory stores by subsequent candidate position setting means and allows the first part holding means to front on the empty part housing unit of the subsequent candidate. Subsequently, the housing or extracting controller repeats operation followed by the detection of the presence of the part in the part housing unit by the first sensor.

As a result, the part housing or extracting apparatus can smoothly perform the housing of the ring by allowing the first part holding means to front on a part housing unit of a subsequent candidate even if the part is actually housed in the part housing unit that the first part holding means first fronts on and is expected to be empty.

Further, the part housing or extracting apparatus detects the presence of the part held by the first part holding means by the second sensor when the housing operation is completed. Subsequently, if the part held by the first part holding means is detected by the second sensor when the housing operation is terminated, the part to be housed is not housed and held by the first part holding means. Accordingly, an error is decided to exist by the error deciding means and the housing operation is stopped by the stopping means.

Hence, such a condition under which the part housing unit that ought to house the part due to a failure of the housing operation is actually empty can be prevented.

Furthermore, a fourth aspect of the present invention is directed to a part housing or extracting apparatus wherein the housing or extracting controller further comprises first selecting means which selects an empty part housing unit of a first candidate and an empty part housing unit of a subsequent candidate in the order near to the position of the first part holding unit in accordance with the position of the empty part housing unit and the position of the first part holding means stored in the inventory memory in the housing operation.

In the part housing or extracting apparatus, as described above, when the part is housed in the housing shelf, the housing or extracting controller allows the first part holding means to front on an empty part housing unit of a first candidate, and when the part housing unit is not empty, the subsequent candidate position setting means allows the first part holding means to front on an empty part housing unit of a subsequent candidate. Subsequently, the housing or extracting controller selects the empty part housing unit of the first candidate and the empty part housing unit of the subsequent candidate in the order near to the position of the first part holding means in accordance with the position of the empty part housing unit and the position of the first part holding means stored in the inventory memory by the first selecting means. As a result, the moving distance of the first part holding means can be reduced.

Furthermore, a fifth aspect of the present invention is directed to a part housing or extracting apparatus wherein the second part holding means comprises a first sensor for detecting presence/absence of the part in the part housing unit and a second sensor for detecting the holding of the part when the second part holding means is allowed to front on the part housing unit, and the part housing or extracting apparatus further comprises subsequent candidate position setting means for setting the position of the part housing unit of the subsequent candidate part stored by the housing data memory to allow the second part holding means to front on the part housing unit of the subsequent candidate, when the second part holding means is allowed to front on a part housing unit of a first candidate part which the housing data memory stores by the extracting operation, and when it is detected by the first sensor that the part housing unit of the first candidate part is empty, error deciding means for detecting presence/absence of a part held by the second part holding means with the aid of a second sensor after the end of the extracting operation to decide presence/absence of an error in the extracting operation, and stopping means for stopping each operation when it is decided by the error deciding means that the error is present.

When the part housing and extracting apparatus extracts the part from the housing shelf, first, the housing or extracting controller allows the second part holding means to front on a first candidate part housing unit the housing data storage means stores. The part housing unit is expected to house a part to be extracted according to the storage of the housing data memory, but the part housing unit may actually be empty for the reason that an operator manually extracts the part instead of the second part holding means or the housing operation by the first part holding means was unsuccessful and the part is not housed in the part housing unit.

Thereupon, subsequently, the part housing or extracting apparatus detects the presence of the part inside the part housing unit by a first sensor when the second part holding means fronts on the part housing unit. Further, when the part is detected in the part housing unit by the first sensor, the housing or extracting controller extracts the part from a part housing unit of a first candidate part by the second part holding means as is and terminates extracting operation.

On the other hand, if the part is not detected in the part housing unit by a first sensor, the housing or extracting controller newly sets a position of a part housing unit of a subsequent candidate part the housing data memory stores by a subsequent candidate position setting means and allows the second part holding means to front on the part housing unit of the subsequent candidate part. Further, the housing or extracting controller repeats the operation followed by the detection of the presence of the part in the part housing unit by the first sensor.

As a result, the part housing or extracting apparatus can smoothly perform the housing or extracting of the ring by allowing the first or second part holding means to front on a subsequent candidate part housing part even when a part housing unit on which the second part holding means is first made to front and is expected to house the part is actually empty.

Further, the part housing or extracting apparatus detects the presence of the part held by the second holding means by a second sensor when the extracting operation is terminated. Subsequently, when the extracting operation is terminated, if the part is not detected in the second part holding means by the second sensor, a part to be extracted is not extracted and the part is not held by the second part holding means. Accordingly, an error is decided to exist by the error deciding means and the extracting operation is stopped by the stopping means.

This can prevent a condition under which the part is actually left in the part housing unit that is expected to be empty due to a failure of the extracting operation.

Furthermore, a sixth aspect of the present invention is directed to a part housing or extracting apparatus, further comprising a second selecting means for selecting a part housing unit of a first candidate part and a part housing unit of a subsequent candidate part in order suitable as the part to be extracted in accordance with the inherent data of the part stored in the housing data memory during the extracting operation.

In the part housing or extracting apparatus, as described above, to extract the part from the housing shelf, the housing or extracting controller allows the second part holding means to front on a part housing unit of a first candidate part, and the second part holding means is made to front on a part housing unit of a subsequent candidate part by the subsequent candidate moving means when the part housing unit is empty. Accordingly, the housing or extracting controller selects the part housing unit of the first candidate part and the part housing unit of the subsequent candidate part by second selecting means in the order in which the part stored in the housing data memory is suitable as the part to be extracted in accordance with the inherent data of the part. As a result, even if the part housing unit of the first candidate part is empty, an appropriate part can be extracted following a first candidate part.

Furthermore, a seventh aspect of the present invention is directed to a part housing or extracting apparatus wherein the housing or extracting controller further comprises storage updating means for updating the inventory memory in accordance with a detection result of the part in the part housing unit by the first sensor, and the storage of the inventory memory updated by the storage updating means is used for the subsequent housing operation.

The housing or extracting controller checks whether the part is housed in the part housing unit that is expected to be empty and whether the part housing unit that is expected to house the part is empty by detecting the presence of the part in the part housing unit which the first or second part holding means fronts via a first sensor. Accordingly, by updating the storage of the inventory memory by the storage updating means in accordance with the detection result, the storage of the inventory memory is made to conform to an actual state of the housing shelf, and in the next or subsequent housing operation, a condition in which the part is actually housed in an empty part housing unit of a fist candidate part can be decreased.

Not only housing operation by the first part holding means or extracting operation by the second part holding means may fail, but also the housing or extracting of the ring against the part housing unit may become incomplete. At this time, because part of the ring protrudes outside from the part housing unit, the protruded part may interfere with the first or second part holding means that relatively moves along the housing shelf.

Hence, a tenth aspect of the present invention is directed to a part housing or extracting apparatus wherein the second sensor comprises a tip sensor for detecting presence/absence of the ring held by the first or second part holding means at a ring tip opposed to the part housing unit when the ring is normally clasped by the clasp member, and a back end sensor for detecting it at a ring back end on the side opposite to the housing unit.

If the housing operation is normally performed, the ring is completely housed in the part housing unit, so that the ring is not detected by both the tip sensor and back end sensor. Further, when the housing operation was unsuccessful, the ring continues being held by the first part holding means, so that the ring is detected by both the tip sensor and back end sensor.

On the other hand, if the extracting operation is normally performed, the ring is completely be extracted from the part housing unit and held by the second holding means, so that the ring is detected by both the tip sensor and back end sensor. Further, if the housing operation was unsuccessful, the ring continues being left in the part housing unit, so that the ring is not detected by both the tip sensor and back end sensor.

To the contrary, if the housing operation or extracting operation is incomplete, part of the ring protrudes outside from the part housing unit. Accordingly, after the housing operation or extracting operation is performed, the ring is not detected by the back end sensor but the ring is detected only by the tip sensor.

Accordingly, the second sensor can exactly check whether the housing operation or extracting operation was normally performed or unsuccessful, or whether the housing operation or extracting operation is incomplete and part of the ring protrudes outside from the part housing unit.

The ring extracted from the part housing unit by the second part holding means as described above is subsequently conveyed to the lamination process and laminated mutually, then the laminated ring is formed. However, when the ring is conveyed to the laminate process, it is troublesome to convey the extracted ring one by one.

Hence, an eleventh aspect of the present invention is directed to a part housing or extracting apparatus wherein the second part holding means further comprises a temporary housing member for temporarily housing a plurality of rings clasped and extracted by the clasp members when it retreats from the part housing unit to convey the temporary housing member housing the plurality of rings to the next process.

In the part housing or extracting apparatus, when the second part holding means extracts the ring from the part housing unit as described above and retreats from the part housing unit, the extracted ring is temporarily housed in the temporary housing member. Subsequently, the part housing or extracting apparatus conveys the temporary housing member to the next process if the predetermined number of rings is temporarily housed in the temporary housing member. Accordingly, the part housing or extracting apparatus can collectively convey the predetermined number of the rings to the next process, and this indicates that the ring can be conveyed more efficiently than the case where the ring extracted by the second part holding means is conveyed one by one.

Furthermore, a twelfth aspect of the present invention is directed to a part housing or extracting apparatus wherein the temporary housing member is provided so as to be relatively ascendable and descendable to the arm members which are insertable, the temporary housing member comprises the temporary housing units for temporarily housing the rings in a multi-stage form, and the arm members temporarily house the rings extracted by the clasp members in such an order as to constitute the laminated ring.

The part housing or extracting apparatus provided with the temporary housing member, first, temporarily houses the ring inserted and extracted by the insertion member in one of the temporary housing units. Subsequently, the temporary housing member ascends and descends against the arm members and moves one of other housing units provided in a plurality of stages to the position where the ring inserted and extracted by the insertion members can temporarily be housed.

At this time, the arm members are freely inserted to the temporary housing unit. Accordingly, by inserting the arm members to a temporary housing unit moved to the position, the ring inserted and newly extracted by the insertion member can temporarily be inserted in the temporary housing unit.

Further, the temporary housing unit temporarily houses the plurality of rings in the order in which the laminated ring is constituted. Accordingly, when the ring temporarily housed in all the temporary housing units in the plurality of stages is conveyed to the next process, the ring ought to be laminated in the next process in the order where it is housed in the temporary housing unit and the laminated ring can easily be formed.

Furthermore, a thirteenth aspect of the present invention is directed to a part housing or extracting apparatus wherein the temporary housing unit comprises a plurality of pairs of second holding members oppositely arranged at predetermined intervals, each pair of the second holding members is arranged in the form of columns mutually at predetermined intervals and holds from its outer peripheral side in a condition where the ring is bent, and when the arm members are retreated into the temporary housing unit by the advance or retreat means, the second holding member is arranged so as to be positioned between the clasp members.

According to the temporary housing unit provided with the configuration, when the intervals of the insertion members are made narrower than the interval of the second holding member provided in opposition and the arm members are made to retreat into the temporary housing unit by the advance or retreat means in a condition in which the ring is held, the second holding member is arranged so as to be positioned between the insertion members. Thereupon, the expanding or shortening means makes the intervals of the insertion members larger than the interval of the second holding member via the arm members, thereby releasing the insertion of the ring using the insertion member and holding the ring from the outer peripheral edge surface by the second holding member instead.

Consequently, according to the part housing or extracting apparatus, because the insertion of the ring using the insertion member is released only by expanding or shortening the intervals of the insertion members by the expanding or shortening means and the ring can be held in the second holding member, the part housing or extracting apparatus can easily perform the temporary housing of the ring in the temporary housing unit.

Besides, when the arm members are made to retreat into the temporary housing unit, the second holding member is arranged so as to be positioned between the insertion members. Accordingly, the second holding member and the insertion members will not interfere mutually and the expanding or shortening operation can be performed by the expanding or shortening means.

Thereupon, the housing shelf houses the plurality of rings, but the housing position of each ring is not in order. Each ring is not aligned according to inherent data in the order of the size of measured values, such as size data, but the inherent data of the size data of each ring is merely associated with the housing position. As a result, when the ring is extracted by the second part holding means in accordance with the order in which the laminated ring is constituted, the ring that matches the order does not always exists in the vicinity of the second part holding means. Accordingly, a travel against the housing shelf of the second part holding means increases.

Thereupon, to extract the ring by the second part holding means, it is desirable that the ring should be extracted in the order in which it is positioned near the second part holding means in the housing shelf regardless of the order in which the laminated ring is constituted, and to temporarily house it in the temporary housing unit, and it is desirable that the ring should be able to be housed temporarily in the order in which the laminated ring is formed.

However, when the second part holding sequentially extracts the ring in the order in which it is positioned near in the housing shelf and temporarily houses it in the temporary housing unit in the order in which the laminated ring is constituted, the ring is housed in the temporary housing unit in improper order. At this time, when the second part holding means is mounted on the advance or retreat means and the advance or retreat means invades into the temporary housing unit together with the second part holding means, the advance or retreat means may interfere with the ring that is already housed temporarily.

Hence, a fourteenth aspect of the present invention is directed to a part housing or extracting apparatus wherein the second part holding means is mounted on the advance or retreat means, and the arm members are provided in the advance or retreat direction of the advance or retreat means, advances into the part housing unit through the temporary housing unit, and has a length which permits the ring housed in the part housing unit to be inserted into the insertion members.

According to the configuration, because the arm members are provided in the advance or retreat direction of the advance or retreat means, the advance or retreat means is positioned at the reverse side of the arm members against the part housing unit. On the other hand, when the arm members are inserted to the temporary housing unit, they advance into the part housing unit through the temporary unit and are provided with the length in which the ring housed in the part housing unit can be inserted using the insertion members.

Accordingly, the advance or retreat means will not interfere with the ring that is already housed temporarily in another temporary housing unit when the arm members are inserted in the temporary housing unit and the second part holding means can house the ring in each temporary housing unit in improper order.

Furthermore, a fifteenth aspect of the present invention is directed to a part housing or extracting apparatus wherein the second part holding means is mounted on the advance or retreat means in parallel with the advance or retreat direction, and the temporary housing unit has an opening through which the second part holding means mounted on the advance or retreat means can pass.

According to the configuration, the second part holding means is mounted on the advance or retreat means in parallel to the advance or retreat direction of the advance or retreat means and freely passes through an opening provided in the temporary housing unit. Accordingly, because the second part holding means extracts the ring from the part housing unit, the advance or retreat means will not invade into the temporary housing unit even when it advances into the temporary housing unit.

As a result, the advance or retreat means will not interfere with the ring that is already housed temporarily in another temporary housing unit when the second part holding means advances into the temporary housing unit and the second part holding means can house the ring in each of the temporary housing units in improper order.

The part housing or extracting apparatus of the present invention can extract the ring housed in the part housing unit in the order in which it is positioned near in the second part holding means regardless of the order in which the laminated ring is constituted by making the second part holding means and the temporary housing unit have either of the configurations, and can temporarily house the ring in the temporary housing member in accordance with the order in which the laminated ring is constituted.

As described above, the laminated ring can be formed by laminating the ring extracted by the part housing or extracting apparatus of the present invention in accordance with the order in which it is temporarily housed in the temporary housing member in the next process. However, if there is a temporary housing unit in which the ring is not housed temporarily in part of the temporary housing member, a defect occurs in the part that corresponds to the ring that is not temporarily housed of the laminated ring and the laminated ring cannot be formed.

Hence, a sixteenth aspect of the present invention is directed to a part housing or extracting apparatus wherein the temporary housing unit further comprises means for detecting that the rings are temporarily housed in all the temporary housing units. This can certainly form the laminated ring in the next process without generating the defect.

BEST MODE FOR CARRYING OUT THE INVENTION

A part housing or extracting apparatus 1 of this embodiment is used for the housing or extracting of an endless stripe metal ring provided with elasticity that constitutes each layer of a laminated ring used as a belt for a continuously variable transmission (CVT). After the metal ring is manufactured so that size data, such as circumferential values, can be design values, the size data of each metal ring is measured separately as the inherent data of the metal ring.

Figure 1:
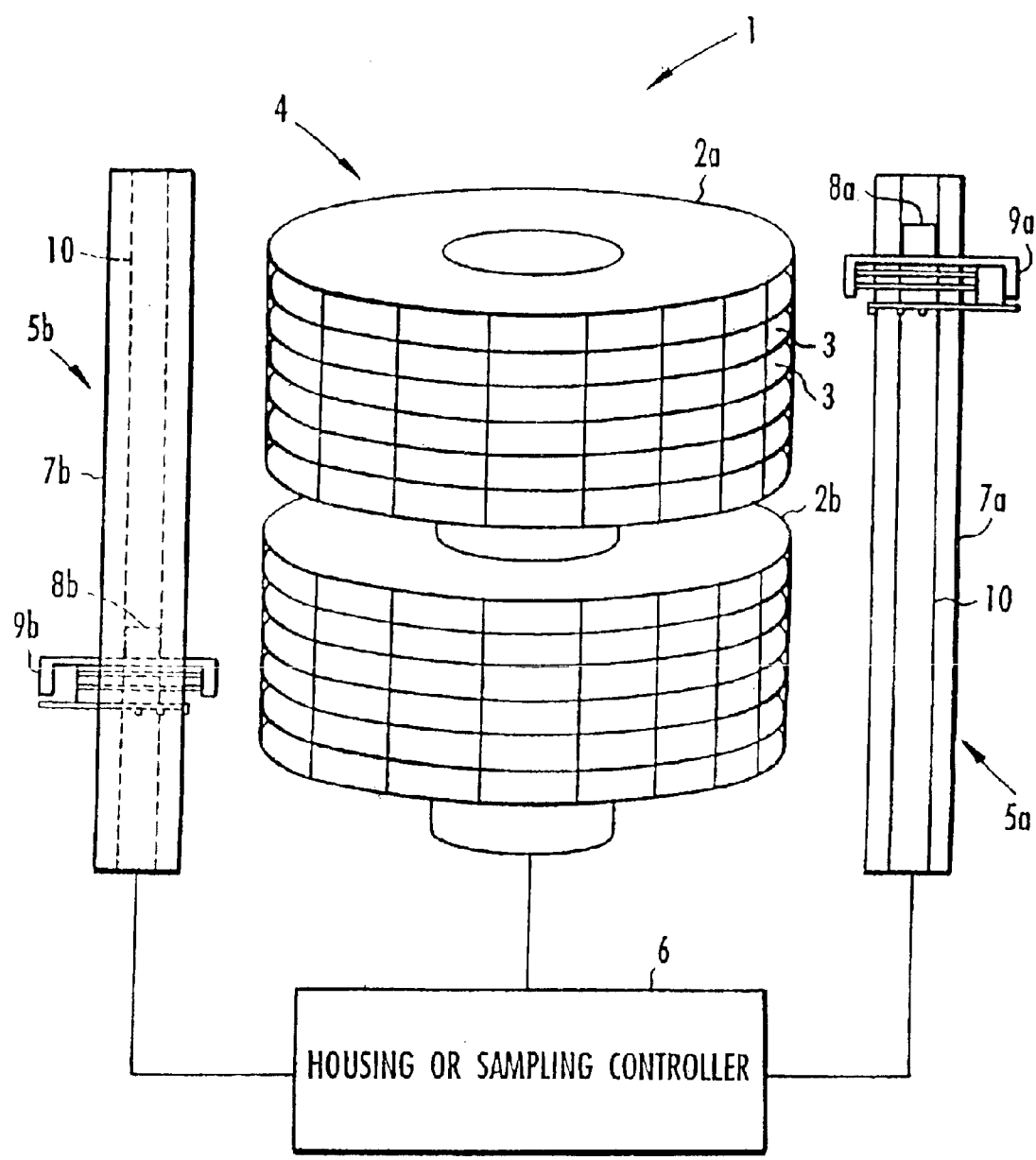
FIG. 1 is a system configuration drawing of an embodiment in a part housing or extracting apparatus of the present invention.

The part housing or extracting apparatus 1, as shown in FIG. 1, is provided with a housing shelf 4 that coaxially laminates two cylindrical bodies 2a, 2b having a part housing unit 3 defined by partitioning a peripheral edge in many stages and columns in an erect state and freely rotates each of the cylindrical bodies 2a, 2b independently. Further, the part housing or extracting apparatus 1 is provided with ring housing or conveying means 5a provided along the external surface of the housing shelf 4, ring extracting or conveying means 5b provided at the position contrasted with the ring housing or conveying means 5a along the external surface of the housing shelf 4, and a housing or extracting controller 6 that controls the operations of the cylindrical bodies 2a, 2b, ring housing or conveying means 5a, and ring extracting or conveying means 5b.

The part housing unit 3 opens the outer peripheral edge surface end faces of the cylindrical bodies 2a, 2b and can house and extract the metal ring from the end faces. Further, the ring housing or conveying means 5a is provided so that it can receive the metal ring from the previous process at the position and the ring extracting or conveying means 5b is provided so that the metal ring extracted at the position can be conveyed to the next process.

The ring housing or conveying means 5a consists of a columnar member 7a provided in parallel to the height direction of the housing shelf 4 along the external surface of the housing shelf 4, vertical moving means 8a provided in the vertical direction along the columnar member 7a so as to freely move, and first ring holding means 9a provided in the vertical moving means 8a. Further, the ring extracting or conveying means 5b consists of a columnar member 7b provided in parallel to the height direction of the housing shelf 4 along the external surface of the housing shelf 4 corresponding to the ring housing or conveying means 5a, vertical moving means 8b provided in the vertical direction along the columnar 7b so as to freely move, and second ring holding means 9b provided in the vertical moving means 8b.

As vertical moving means 8a, 8b, for example, the means that are driven by a motor not shown, engaged with gears not shown and provided at a groove 10 formed in the columnar members 7a, 7b along the vertical direction, and move vertically can be used.

Figure 2:
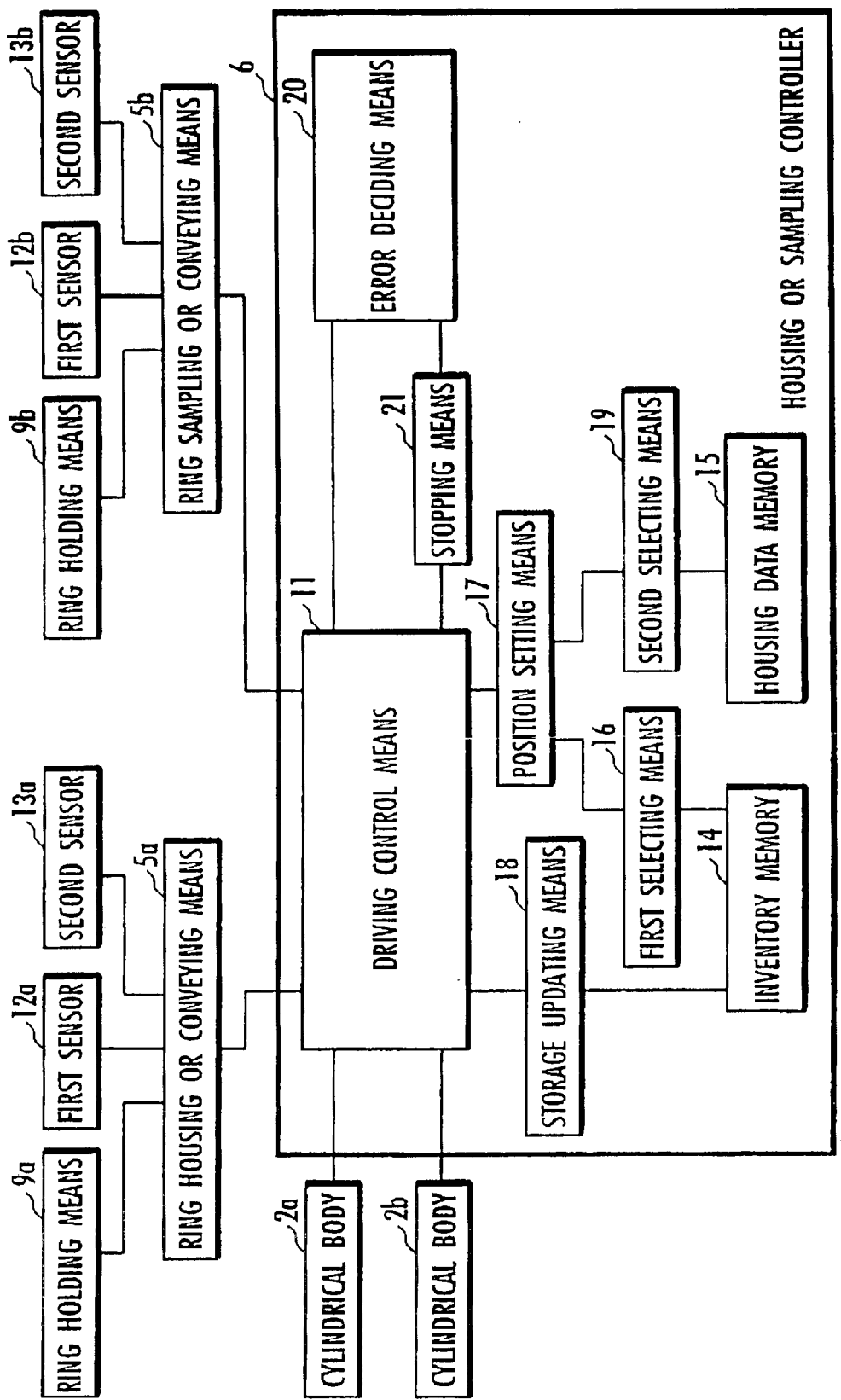
FIG. 2 is a block diagram showing the configuration of a housing or extracting controller shown in FIG. 1.

Next, the housing or extracting controller 6 is a microcomputer composed of a CPU, ROM, and RAM and the like, as shown in FIG. 2, is provided with driving control means 11, an inventory memory 14, a housing data memory 15, first selecting means 16, position setting means 17, storage updating means 18, second selecting means 19, error deciding means 20, and stopping means 21.

The driving control means 11 is provided with a function that controls the drive of the cylindrical bodies 2a, 2b, ring housing or conveying means 5a, ring extracting or conveying means 5b, first ring holding means 9a, and second ring holding means 9b and inputs a detection signal from a first sensor 12a and a second sensor 13a mounted on the first ring holding means 9a of the ring housing or conveying means 5a and a detection signal from the first sensor 12b and the second sensor 13b mounted on the second ring holding means 9b of the ring extracting or conveying means 5b.

Further, the inventory memory 14 stores the presence of a metal ring W regarding each part housing unit 3 of the housing shelf 4 and the housing data memory 15 stores the size data of the metal ring W in connection with the position of the part housing unit 3 that houses the metal ring W. The inventory memory 14 is connected to the driving control means 11 via the first selecting means 16 that selects the part housing unit 3 that should newly house the metal ring W and via the position setting means 17 and inputs the correction data regarding the presence of the inventory of the metal ring W in each part housing unit 3 from the driving control means 11 via the storage updating means 18.

On the other hand, the housing data memory 15 is connected to the second selecting means 19 that selects the metal ring W to be extracted and the driving control means 11 via the setting means 17. The position setting means 17 is provided with a function that sets the position of the part housing unit 3 selected by the first selecting means 16 for the driving control means 11 and a function that sets the position of the part housing unit 3 that houses the metal ring selected by the second selecting means 19 for the driving control means 11.

Further, the error detecting means 20 decides the presence of an error of housing operation using a detection signal from the second sensor 13a input via the driving control means 11 and decides the presence of an error of extracting operation using a detection signal from the second sensor 13b input via the driving control means 11. Further, the error deciding means 20 is provided with a function that stops the driving control means 11 by the stopping means 21 that intervenes between it and the driving control means 11 and thereby stops the entire operation of the housing or extracting control means 6 when an error is decided to exist in the housing operation or extracting operation.

Next, the housing operation of a metal ring by the part housing or extracting apparatus 1 of the present embodiment is described with reference to FIGS. 4 to 10 in accordance of the flowchart of FIG. 3.

Figure 3:
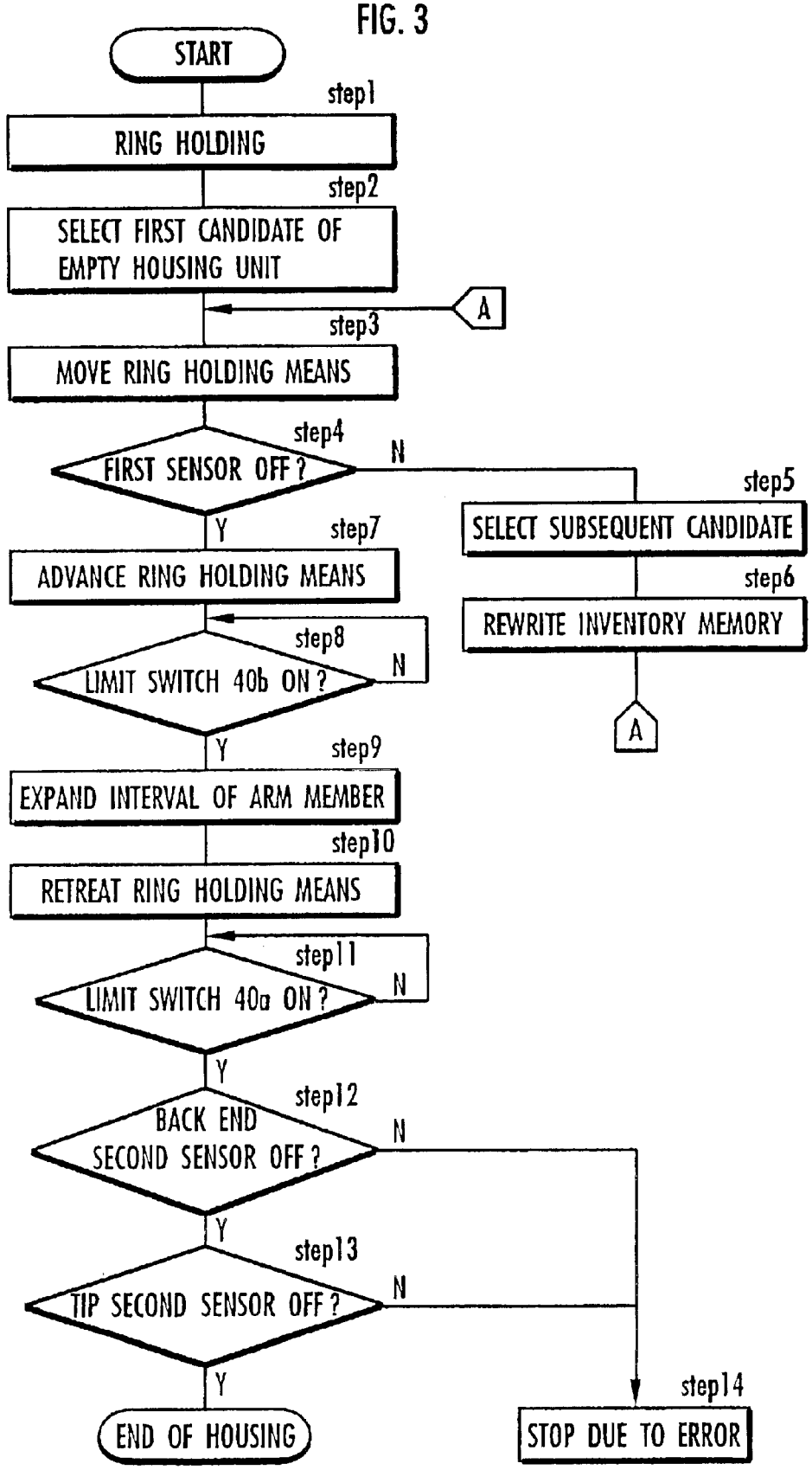
FIG. 3 is a flowchart showing housing operation of a part in the apparatus shown in FIG. 1.

When the housing operation of a metal ring is performed by the part housing or extracting apparatus 1, first, in step 1 of FIG. 3, a metal ring manufactured in the previous process is held by the first ring holding means 9a of the ring housing or conveying means 5a. After the metal ring is manufactured in the previous process, size data, such as circumference and thickness, is measured as inherent data of the metal ring separately.

Figure 4:
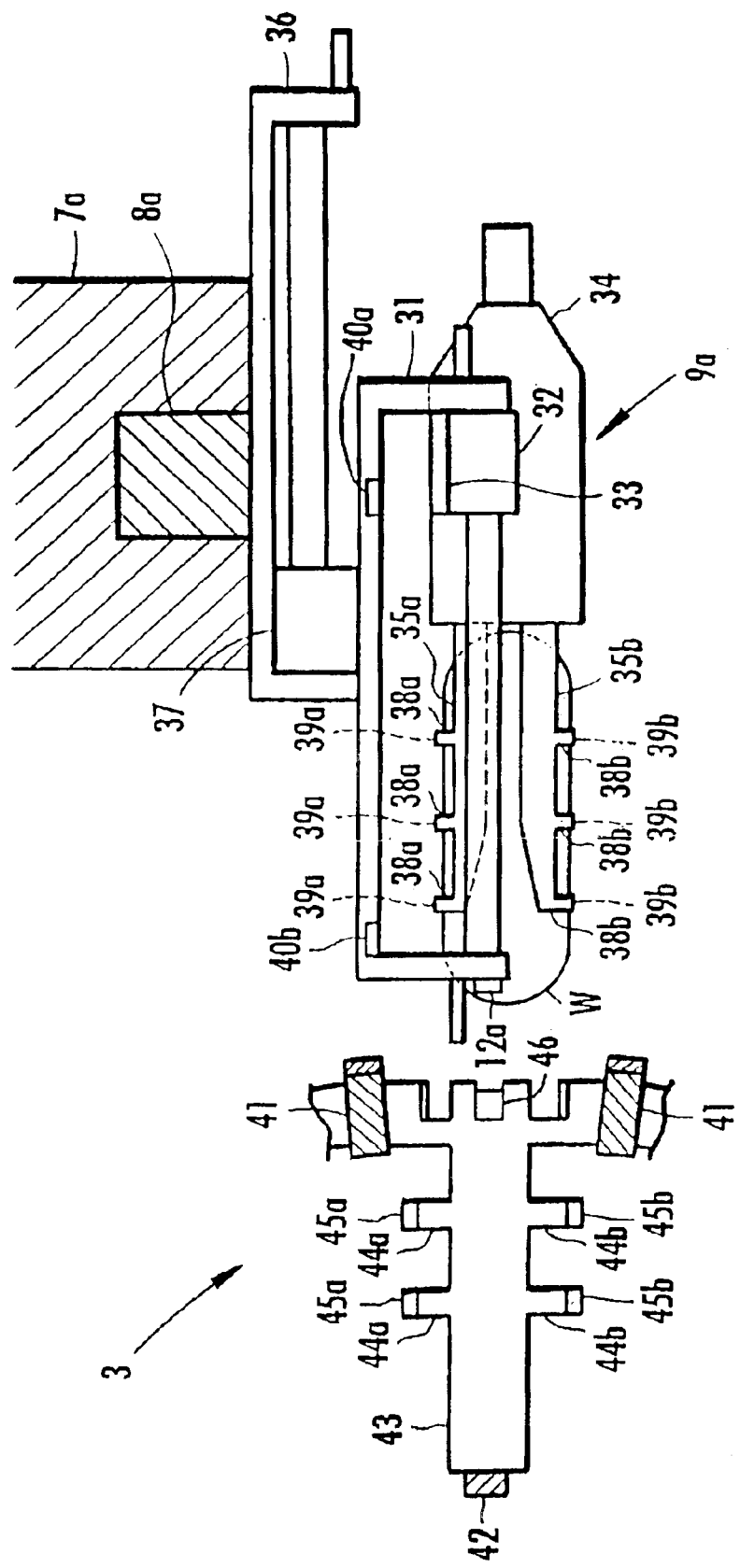
FIG. 4 is a top view showing the configuration between first part holding means and a part housing unit 3 in the apparatus shown in FIG. 1.

The first ring holding means 9a has the same configuration as the second holding means 9b of the ring extracting or conveying means 5b and, as shown in FIG. 4, is provided with a substrate 34 hung via a hanging member 33 at the lower part of a rodless cylinder 32 mounted in a U-shaped member 31 and arm members 35a, 35b provided at the lower part of the substrate 34. As a result, the first ring holding means 9a is mounted on the rodless cylinder 32 via the hanging member 33 and the arm members 35a, 35b are provided in the advance or retreat direction of the rodless cylinder 32.

Further the U-shaped member 31 is supported in a rodless cylinder 37 mounted on a U-shaped member 36 and the U-shaped member 36 is supported by the vertical moving means 8a provided in the vertical direction along the side of the columnar member 7a so as to freely move.

An expanding or shortening mechanism described later is provided on the substrate 34 and the arm members 35a, 35b are provided by the expanding or shortening mechanism so as to freely be expanded and shortened. The arm members 35a, 35b are provided with protrusion units 38a, 38b that protrude outside from three places along the length direction at the opposite position and the protrusion units 38a, 38b are provided with insertion members 39a, 39b that protrude downward at the tip. Further, the first ring holding means 9a inserts the metal ring W between the opposed insertion members 39a, 39b from the outer peripheral edge surface by narrowing the intervals of the arm members 35a, 35b by the expanding or shortening mechanism.

Limit switches 40a, 40b that detect the starting point and endpoint of a stroke of the rodless cylinder 32 are provided in the U-shaped member 31 along the moving direction of the first ring holding means 9a and the first sensor 12a that detects the presence of a metal ring W in the part housing unit 3 is mounted at the tip opposed to the part housing unit 3. Further, a second sensor (not shown) that detects the presence of a metal ring W inserted to the insertion members 39a, 39b is provided in the arm members 35a, 35b.

On the other hand, the part housing unit 3 is formed with a first strut 41 provided in the housing shelf 4, a second strut 42, and a shelf plate 43 supported at both the struts 41, 42. A plurality of first struts 41 are provided by partitioning the external surface of the cylindrical bodies 2a, 2b in many columns and the second strut 42 is arranged at the internal surface between the adjacent two first struts 41.

The shelf plate 43 is inserted, supported in a horizontal groove that is engraved in the struts 41, 42 not shown, and provided in a plurality of stages. The shelf plate 43 is provided with protruded pieces 44a, 44b at the opposite position that protrude outside from two places along the length direction at the side and holding members 45a, 45b opposed at predetermined intervals are formed in the protruded pieces 44a, 44b by bending the tip upward. Further, a reflecting plate 46 opposed to the first sensor 12a is formed on the shelf plate 43 by bending part of the outer peripheral edge surface edge opposed to the first holding means 9a downward.

Next, the expanding or shortening mechanism provided in the first ring holding means 9a is described. The first ring holding means 9a, as shown in FIG. 5(a), is provided with a link mechanism 51 as a mechanism that drives the arm members 35a, 35b provided at the lower part of the substrate 34 and expands or shortens the intervals of the arm members 35a, 35b. The link mechanism 51 is provided at the-back ends of the arm members 35a, 35b and consists of two sets of links 52a, 52b, 53a, 53b and a cylinder 54 that drives the links 52a, 52b, 53a, 53b.

The links 52a, 52b are fastened to the arm members 35a, 35b with screws via holes 55a, 55b provided in the width direction of the substrate 34 and freely move along the holes 55a, 55b. Further, the back ends of the links 52a, 52b are both fastened to a cylinder rod 57 of the cylinder 54 with screws via a hole 56 provided in the length direction of the substrate 34 and freely move along the hole 56 in accordance with the operation of the cylinder rod 57.

The links 53a, 53b are fastened to the arm members 35a, 35b with screws via holes 58a, 58b provided in the width direction of the substrate 34 and freely move along the holes 58a, 58b. Further, the back ends of the links 53a, 53b are both fastened to a cylinder rod 57 of the cylinder 54 with screws via a hole 59 provided in the length direction of the substrate 34 and freely move along the hole 59 in accordance with the operation of the cylinder rod 57.

In FIG. (a), the cylinder rod 57 is made to retreat by the cylinder 54 and the respective back ends of the links 52a, 52b, 53a, 53b are moved to the cylinder 54 side along the holes 56, 59. Following this, the respective tips of the links 52a, 52b, 53a, 53b move inside the substrate 34 along the holes 55a, 55b, 58a, 58b. At this time, the intervals of the insertion members 38a, 38b provided in the arm members 35a, 35b are most shortened and a metal ring W is bent in an oval shape and can be inserted between three sets of the insertion members 39a, 39b.

Next, as shown by the arrows in FIG. 5(b), when the cylinder rod 57 is made by the cylinder 54 to advance, the respective back ends of the links 52a, 52b, 53a, 53b move to the side where they are separated from the cylinder 54 along the holes 56, 59. Following this, the respective tips of the links 52a, 52b, 53a, 53b move to the outside of the substrate 34 along the holes 55a, 55b, 58a, 58b and expand the intervals of the insertion members 38a, 38b provided in the arm members 35a, 35b. At this time, a metal ring W is deformed so as to return to a circle followed by the expansion of the intervals of the insertion members 38a, 38b, but maintains the state in which it was inserted between the insertion members 38a, 38b by the elasticity.

Returning to FIG. 3, the housing or extracting controller 6, in step 2, selects the empty part housing unit 3 that should house a metal wing W held by the first ring holding means 9a. The empty part housing unit 3 is selected by the first selecting means 16 of FIG. 2. Among the empty part housing units 3 that the inventory memory 14 stores, the part housing unit 3 at the position where a travel (amount of rotation) of the cylindrical body 2a or cylindrical body 2b is most reduced is selected and regarded as the first candidate empty part housing unit 3.

If the first candidate empty part housing unit 3 is selected, in step 3, the position of the part housing unit 3 is set for the driving control means 11 by the position setting means 17. As a result, the housing or extracting controller 6 drives the cylindrical bodies 2a, 2b and the ring housing means 5a by the driving control means 11 and moves the first ring holding means 9a to the position fronting on the part housing unit 3.

When the first ring holding means 9a is moved to the position fronting on the part housing unit 3, the housing or extracting controller 6, subsequently, in step 4, checks by the first sensor 12a whether the part housing unit 3 is actually empty.

Figure 6:
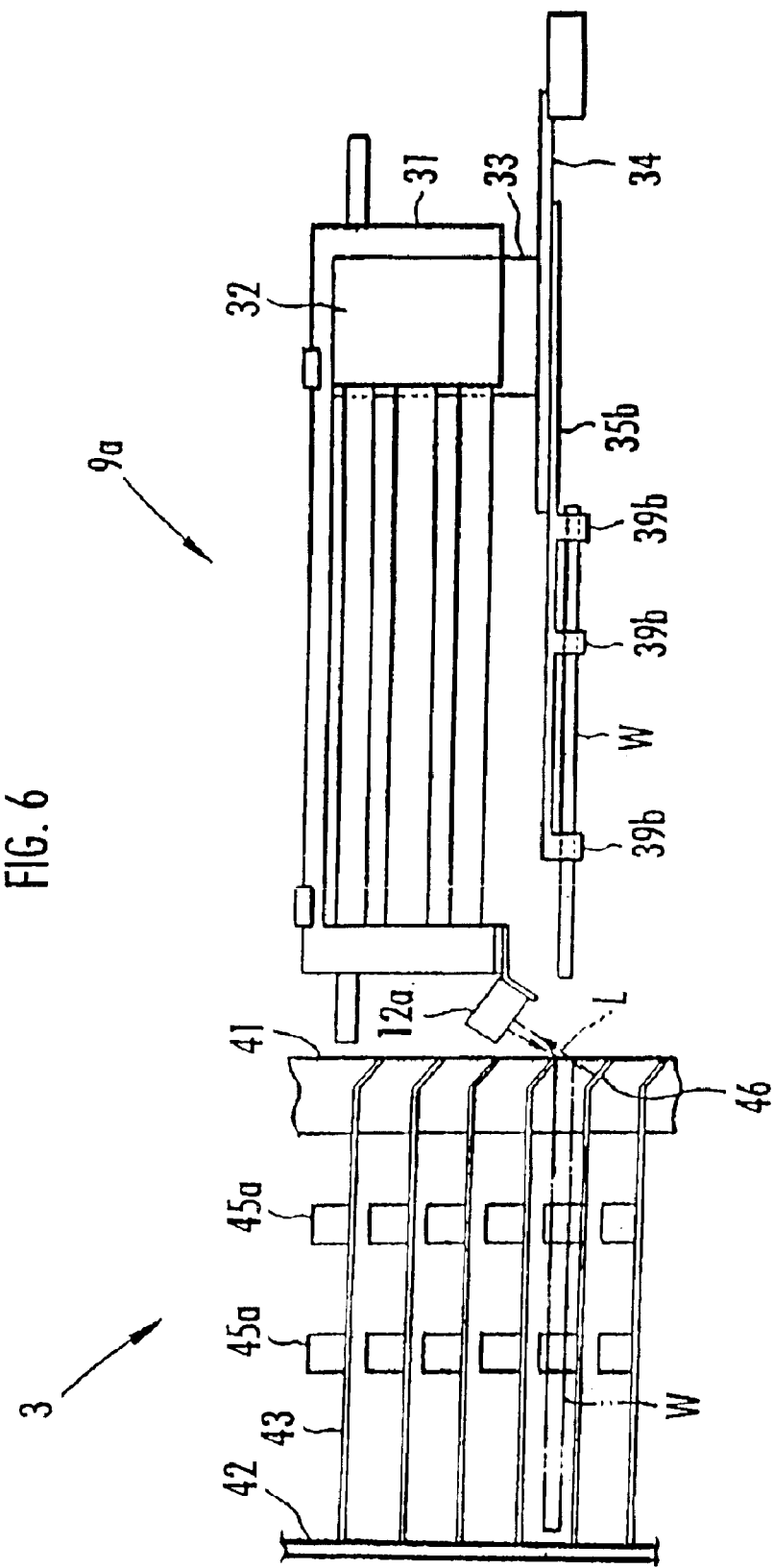
FIGS. 6 to 10 are explanatory operation diagrams showing the housing operation of the part in the apparatus shown in FIG. 1.

The first sensor 12a is a reflection type optical sensor and is provided with a light emitting unit and a light reception unit. As shown in FIG. 6, when light L is emitted from the light reception unit of the first sensor 12a to the opposed part housing unit 3, the light L is reflected by the reflecting plate 46 of the part housing unit 3 and is incident on the light reception unit of the first sensor 12a if a metal ring W is not housed in the part housing unit 3. On the other hand, as virtually shown in FIG. 6, if the metal ring W is housed in the part housing unit 3, the light L emitted from the light reception unit of the first sensor 12a cannot be incident on the light reception unit of the first sensor 12a because an optical path is intercepted by the metal ring W between the first sensor 12a and the reflecting plate 46.

The first sensor 12a turns off (the part housing unit 3 is empty) when the light emitted from the light emitting unit is reflected by the reflecting plate 46 and is incident on the light reception unit, and turns on (a metal ring W exists in the part housing unit 3) when the light is not incident on the light reception unit, then outputs a detection signal to the driving control means 11.

Thereupon, the housing or extracting controller 6 judges that the metal ring W is actually housed in the first candidate part housing unit 3 when the driving control means 11 receives an ON detection signal from the first sensor 12a. In this case, in step 5, the part housing unit 3 in which the travel of the cylindrical body 2a or cylindrical body 2b is smallest at present is reselected from the empty part housing unit 3 that the inventory memory 14 stores by the first selecting means 16 and specified as the empty part housing unit 3 of a subsequent candidate. Subsequently, the driving control means 11, in step 6, rewrites inventory memory data by the storage updating means 18 and stores the first candidate empty part housing unit 3 as the part housing unit 3 that houses a metal ring W, then processing returns to step 3. The data of the inventory memory 14 rewritten at this time is used for the next housing operation.

The procedures of steps 3 to 6 can be repeated any number of times as occasion demands and the first ring holding means 9a is exactly moved to the position fronting on the empty part housing unit 3. Subsequently, in step 4, if it is checked that the driving control means 11 receives an OFF detection signal from the first sensor 12a and the part housing unit 3 on which the first ring holding means 9a fronts is actually empty, the housing or extracting controller 6 subsequently, in step 7, drives the rodless cylinder 32 by the driving control means 11 and advances the first ring holding means 9a, then advances it into the part housing unit 3.

Figure 7:
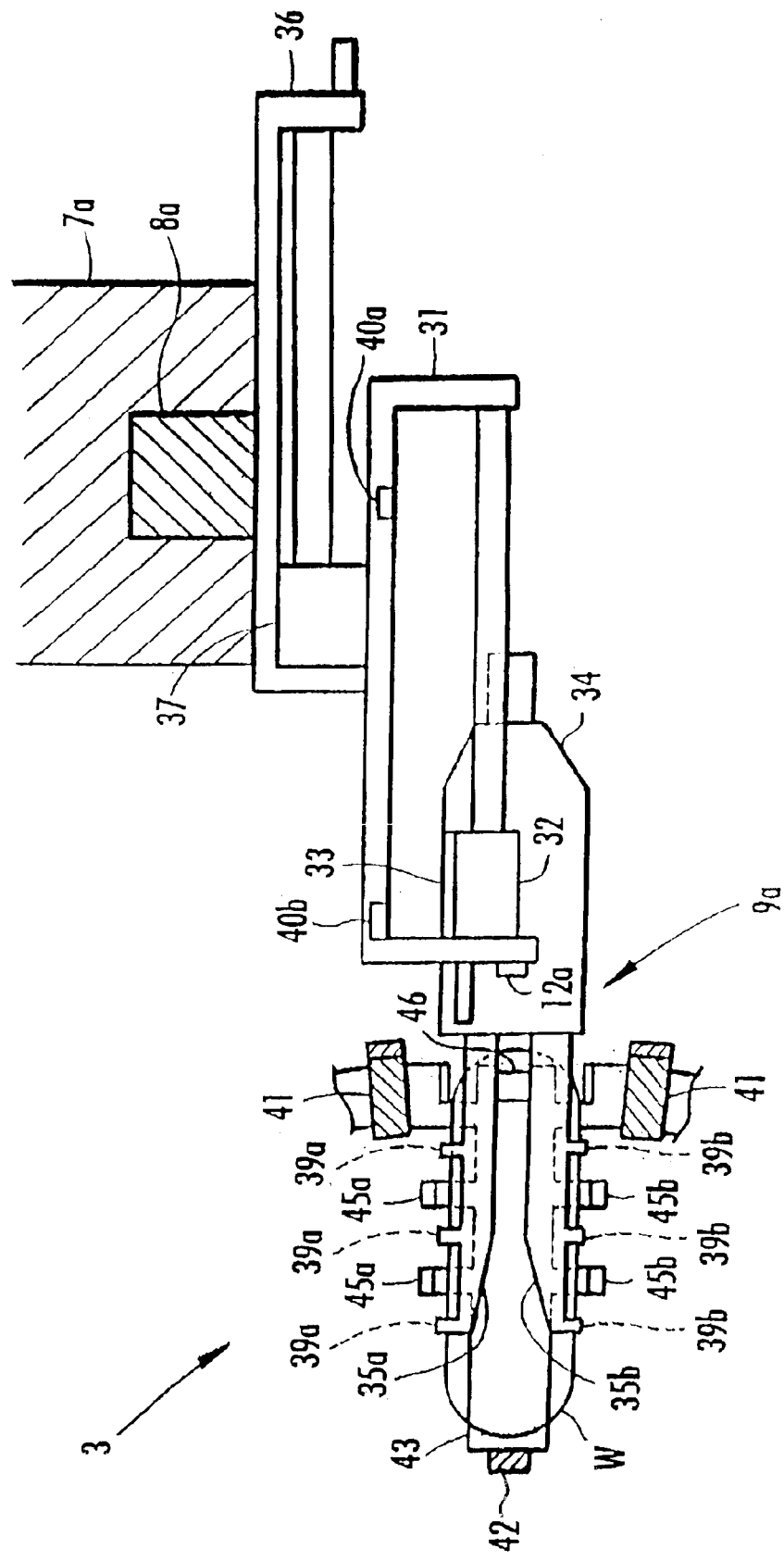

As a result, the first ring holding means 9a, as shown in FIG. 7, conveys a metal ring W inserted between the insertion members 39a, 39b into the part housing unit 3. When the first ring holding means 9a advances into the part housing unit 3, the intervals of the insertion members 39a, 39b become narrower than the intervals of the holding members 45a, 45b of the part housing unit 3 and the metal ring W is positioned inside the holding members 45a, 45b. The first ring holding means 9a, in step 8, is made to advance until the limit switch 40b is tuned on.

Figure 5:
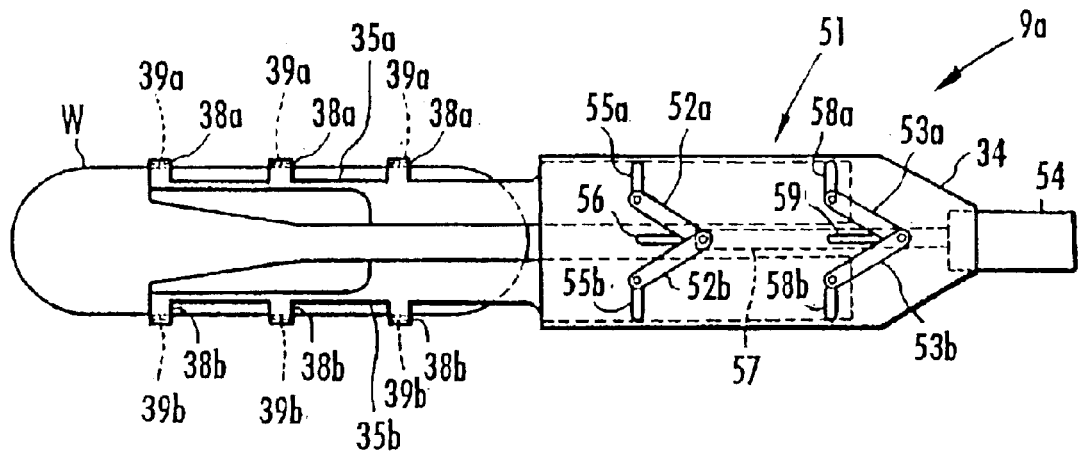
FIG. 5 is a top view showing the configuration and operation of an expanding or shortening mechanism in the first part holding means shown in FIG. 4.
Figure 5:
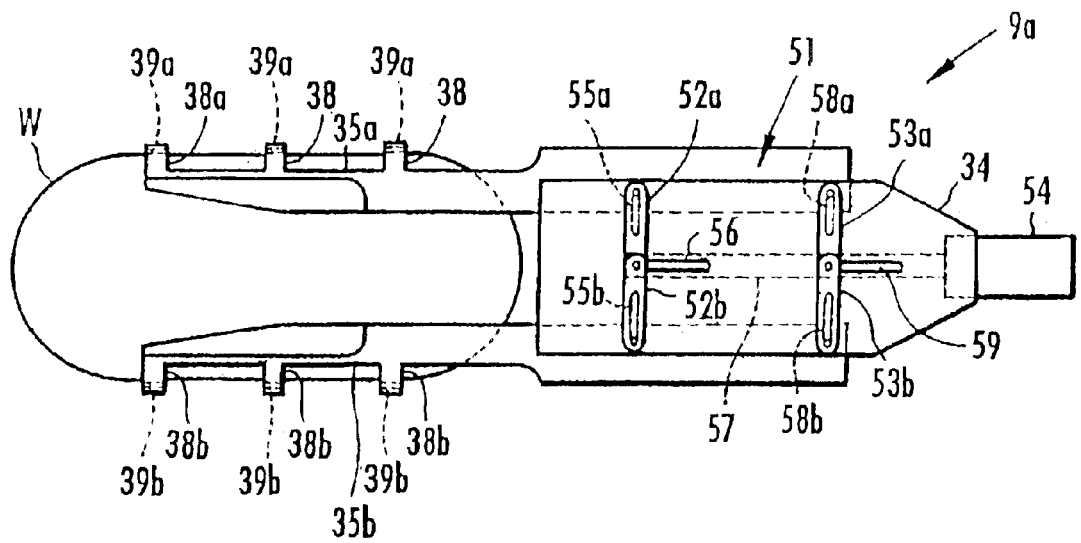
Figure 8:
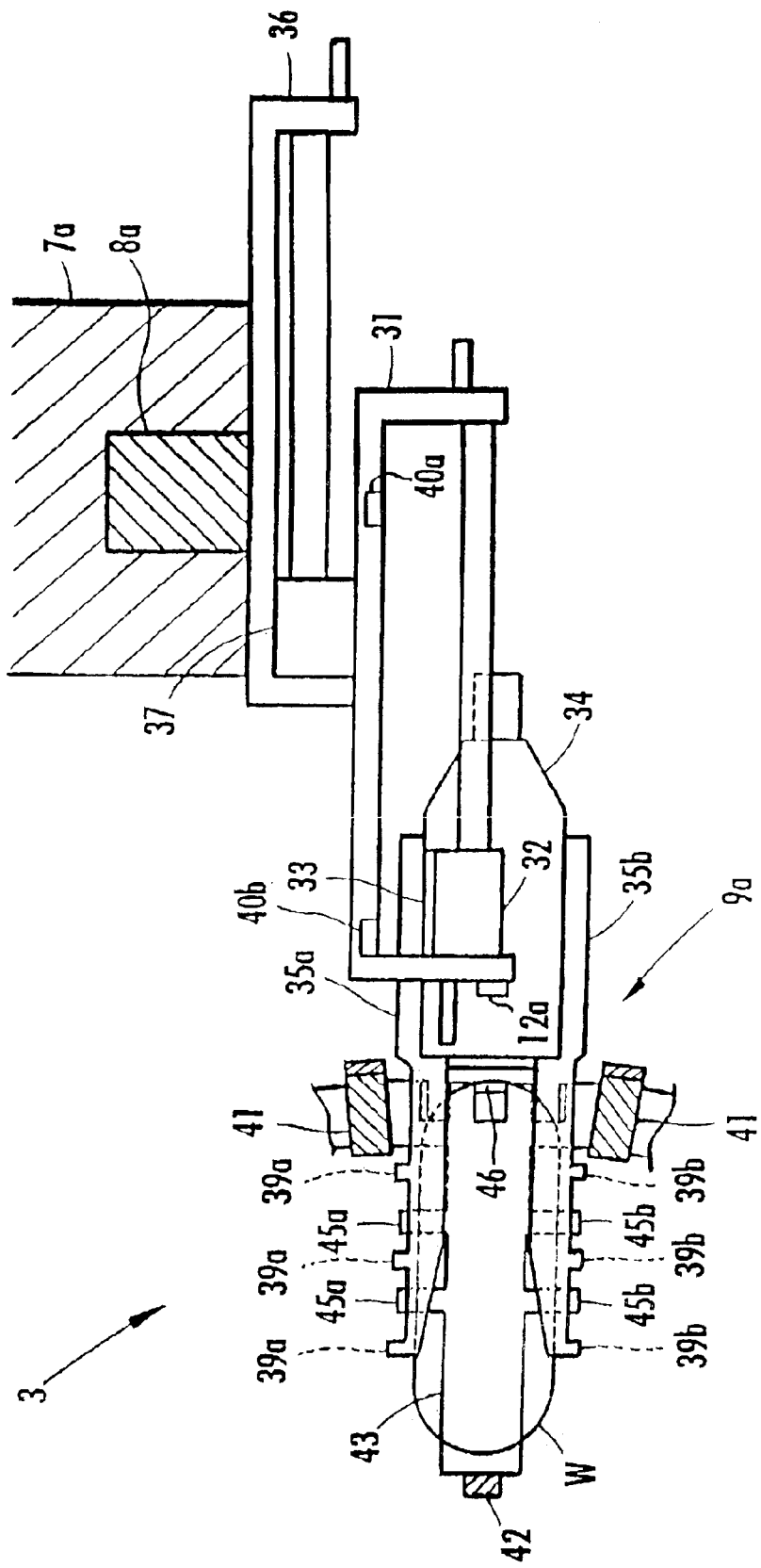

In step 8, when the limit switch 40b turns on, subsequently, the housing or extracting controller 6, in step 9, as shown in FIG. 5 by the driving control means 11, advances the cylinder 57 by the cylinder 54 of the link mechanism 51 and expands the intervals of the arm members 35a, 35b of the link holding member 9a. Consequently, as shown in FIG. 8, the intervals of the insertion members 39a, 39b become wider than the intervals of the holding members 45a, 45b of the part housing unit 3, and a metal ring W will restore a circle by its own elasticity followed by the expansion of the intervals of the insertion members 39a, 39b. Subsequently, a metal ring W is transferred to the holding members 45a, 45b of which the intervals are narrower than those of the expanded insertion members 39a, 39b and held in the holding members 45a, 45b.

Besides, the holding members 45a, 45b are set so as to be lower than the bottom of the arm members 35a, 35b of the ring holding member 9a, whose the top advances into the part housing unit 3. Further, when the limit switch 40b turns on, the holding member 45a is positioned between the insertion members 39a, 39b that advances into the part housing unit 3 and the holding member 45b is positioned between the insertion members 39a, 39b. Accordingly, the holding member 45a, 45b will not interfere with the insertion members 39a, 39b when the arm members 35a, 35b are expanded or shortened.

Figure 9:
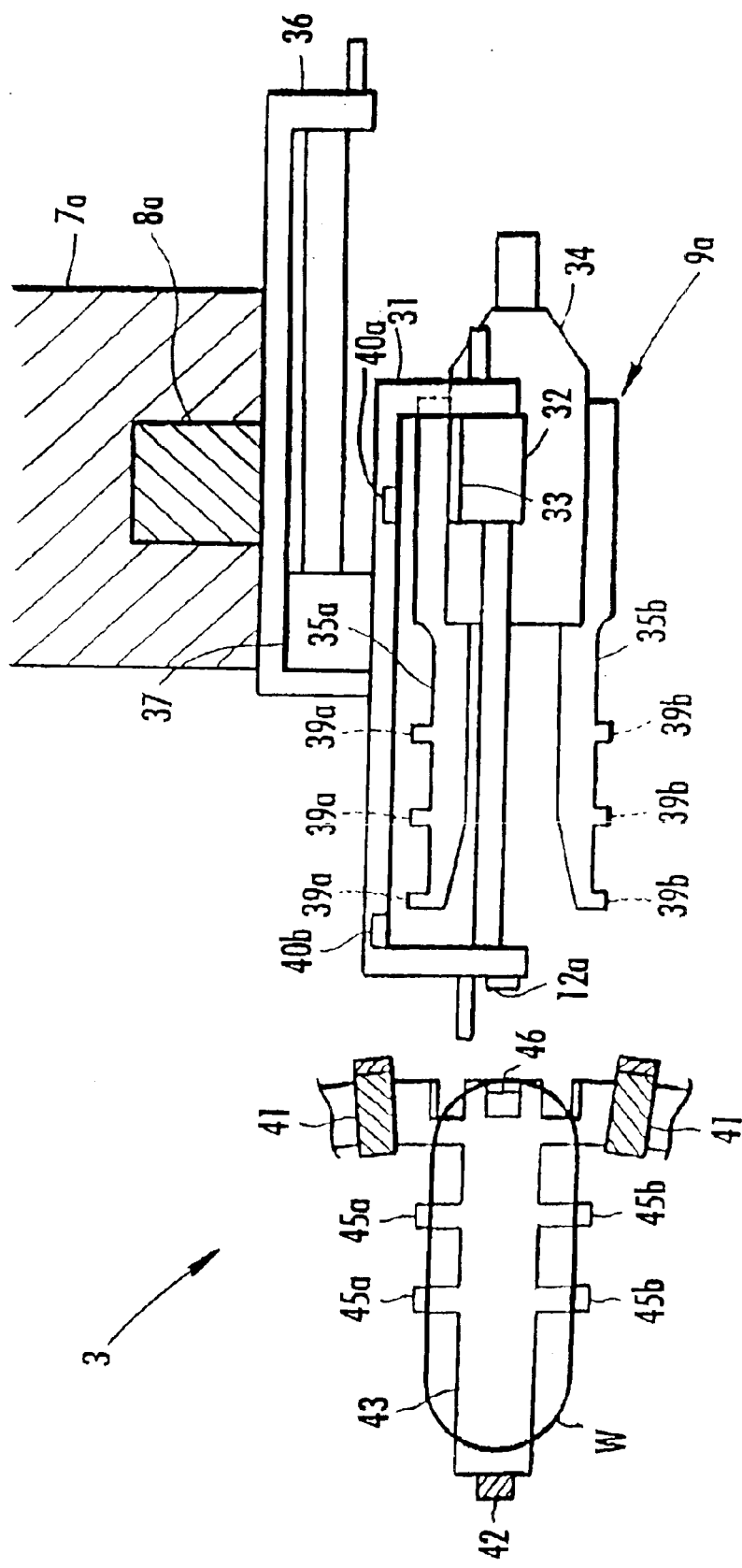

Next, the housing or extracting controller 6, in step 10, drives the rodless cylinder 32 of the first ring holding means 9 by the driving control means 11, retreats the first ring holding means 9a, and exit it from the part housing unit 3. At this time, the first ring holding means 9a, as shown in FIG. 9, continues expanding the intervals of the insertion members 39a, 39b, and a metal ring W is held in the holding members 45a, 45b and left in the part housing unit 3. The first holding means 9a, in step 11, is made to retreat until the limit switch 40a turns on and returns to the position fronting on the part housing unit 3.

If the first ring holding means 9a returns to the position fronting on the part housing unit 3, the housing or extracting controller 6, subsequently, checks by the second sensor 13a whether the first ring holding means 9a holds a metal ring W or not.

Figure 10:
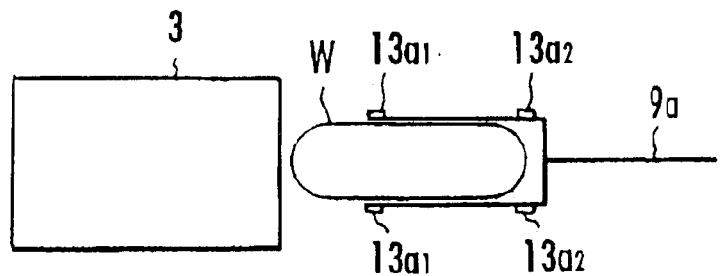
Figure 10:
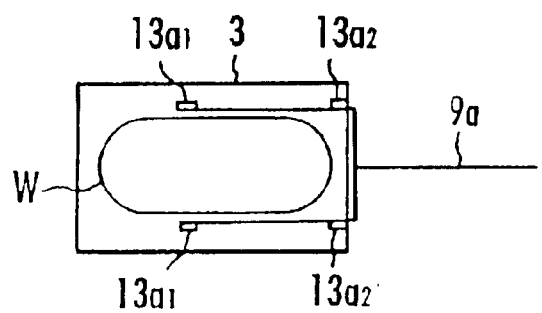
Figure 10:
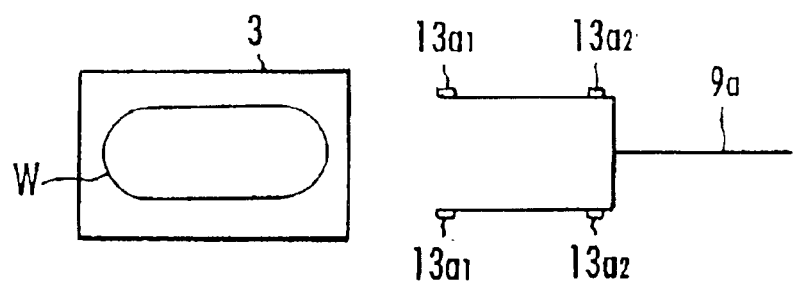
Figure 10:
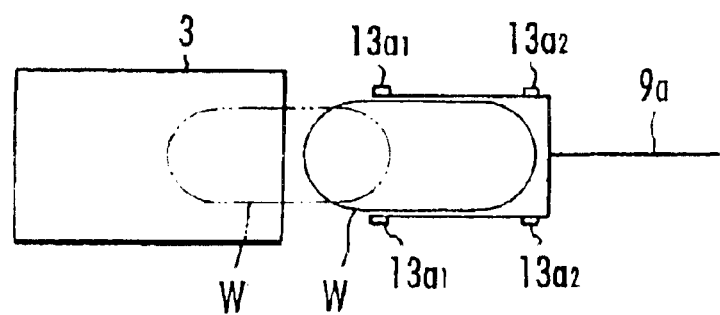

The second sensor 13a, as shown typically in FIG. 10, consists of a tip second sensor $13a_1$ that detects a metal ring W at the tip of the first ring holding means 9a and a back end second sensor $13a_2$ that detects the metal ring W at the back end of the first ring holding means 9a. The tip second sensor $13a_1$ and the back end second sensor $13a_2$ are both transmission type optical sensors and consist of a pair of light emitting and light reception units. Both the tip second sensor $13a_1$ and the back end second sensor $13a_2$ turn off (no metal ring exists) when light emitted from the light emitting unit is incident on the light reception unit and turn on (a metal ring exists) when the light is not incident on the light reception unit, and output a detection signal to the driving control means 11. Besides, FIGS. 10(a), 10(b), and 10(c) correspond to the states of FIGS. 4, 8, and 9 respectively.

The driving control means 11 sends a detection signal input from the second sensors $13a_1$, $13a_2$ to the error deciding means 20 and decides whether housing operation terminates normally when the limit switch 40a turns on and the first ring holding means 9a returns to the position fronting on the part housing unit 3. That is, in step 13, if the OFF of the back end second sensor $13a_2$ is detected in step 12 and in step 13, if the OFF of the tip second sensor $13a_1$ is detected, as shown in FIG. 10(c), the first ring holding means 9a does not hold a metal ring W. Accordingly, the error deciding means 20 decides that the housing operation terminates normally, and the housing operation is completed.

On the other hand, in step 12, when the ON of the back end second sensor $13a_2$ is detected, as shown in FIG. (d), the first ring holding means 9a continues holding a metal ring W. Subsequently, the error deciding means 20 decides that an error exists, and in step 14, stops the entirety of the part housing or extracting apparatus 1 by operating the stopping means 21 and stopping the driving control means 11 due to an error.

Further, even if the OFF of the back end second sensor $13a_2$ is detected in step 12, when the ON of the tip second sensor $13a_1$ is detected in step 13, as shown virtually in FIG. 10(d), the housing of a metal ring W is incomplete and the metal ring W protrudes from the part housing unit 3. Thereupon, the error deciding means 20 also decides that an error exists in this case and in step 14, stops the entirety of the part housing or extracting apparatus 1 by operating the stopping means 21 and stopping the driving control means 11 due to an error.

Next, the housing operation of a metal ring by the part housing or extracting apparatus 1 of the present embodiment is described with reference to FIG. 12 in accordance with the flowchart of FIG. 11. Besides, the second ring holding means 9b has entirely the same configuration as the first ring holding means 9a and the extracting operation of the metal ring by the second ring holding means 9b is performed in entirely the reverse procedures with the housing operation of the metal ring W by the second ring holding means 9b. Accordingly, a detailed description with regard to the configuration and operation of the second ring holding means 9b is omitted.

Figure 11:
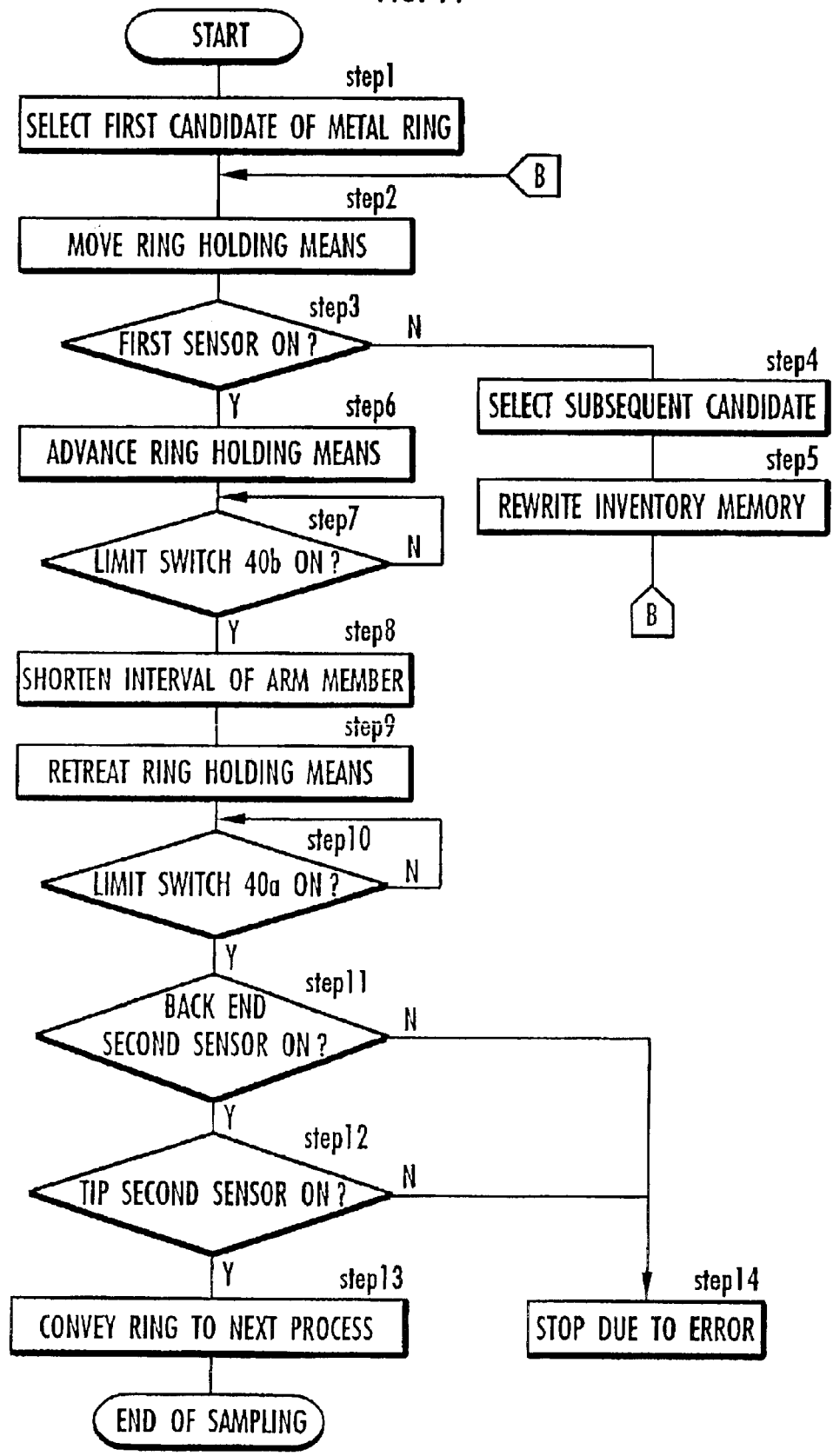
FIG. 11 is a flowchart showing extracting operation of the part in the apparatus shown in FIG. 1.
Figure 12:
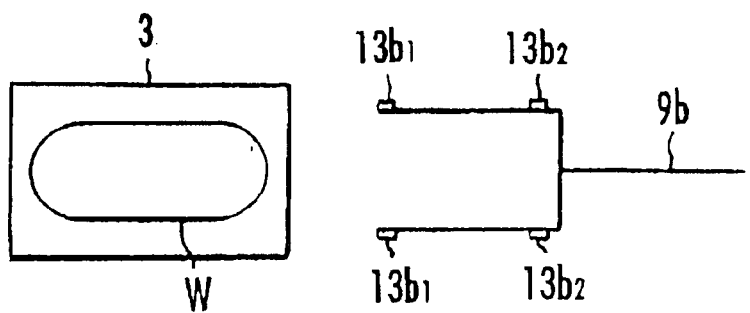
FIG. 12 is an explanatory operation diagram showing the extracting operation of the part in the apparatus shown in FIG. 1.
Figure 12:
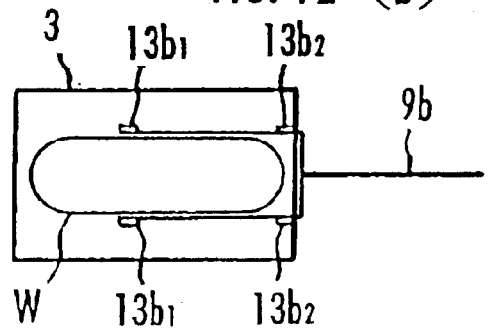
Figure 12:
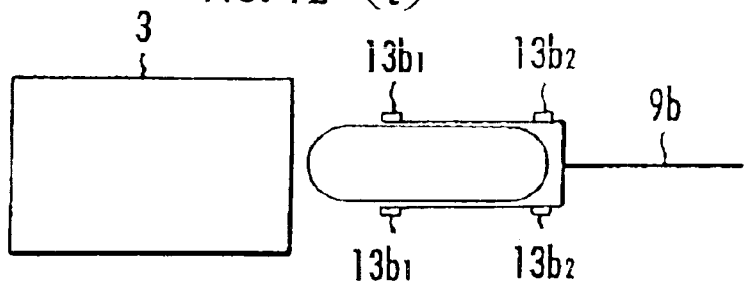
Figure 12:
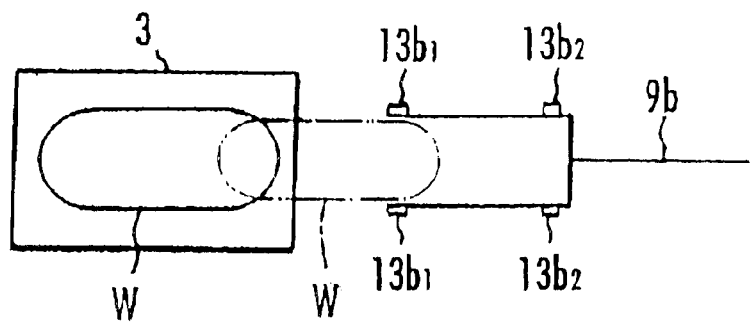

When the extracting operation of a metal ring is performed by the part housing or extracting apparatus 1, first, the housing or extracting controller 6, in the step 1 of FIG. 11, selects the part housing unit 3 that houses a metal ring W to be extracted. The part housing unit 3 that houses the metal ring W to be extracted is selected by the second selecting means 19 of FIG. 2. The metal ring W provided with the optimum size data is selected in accordance with predetermined combination conditions from the metal rings W stored in the housing data memory 15, and the part housing unit 3 stored in connection with the size data is specified as the part housing unit 3 of the first candidate metal ring W.

If the part housing unit 3 of the first candidate metal ring W is selected, the position of the part housing unit 3 is set for the driving control means 11 by the position setting means 17. As a result, the housing or extracting controller 6, in step 2, drives the cylindrical bodies 2a, 2b and the ring extracting or conveying means 5b by the driving control means 11 and moves the second ring holding means 9b to the position fronting on the part housing unit 3.

When the second ring holding means 9b is moved to the position fronting on the part housing unit 3, the housing or extracting controller 6, subsequently, in step 3, checks whether a metal ring W is actually housed in the part housing unit 3 by the first sensor 12b or not.

The first sensor 12b has the same configuration as the first sensor 12a and operates in the same manner as the first sensor 12a. That is, the first sensor 12b turns off (the part housing unit 3 is empty) when light emitted from a light emitting unit is reflected by the reflecting plate 46 and is incident on a light reception unit and turns on (a metal ring W exists in the part housing unit 3) when the light is not incident on the light reception unit, and outputs a detection signal to the driving control means 11.

Thereupon, the housing or extracting controller 6 decides that a metal ring W is not actually housed in the part housing unit 3 of a first candidate ring when the driving control means 11 receives an OFF detection signal from the first sensor 12b. In this case, subsequently, in step 4, a metal ring W provided with the optimum size next to a metal ring W of a first candidate data is reselected following the first candidate metal ring W from the metal rings W stored in the housing data memory 15 by the second selecting means 19 in accordance with present combination conditions and specifies the part housing unit 3 stored in connection with the size data as the part housing unit 3 of the subsequent candidate metal ring W.

Subsequently, the driving control means 11, in step 5, rewrites the data of the inventory memory 14 by the storage updating means 18, stores the part housing unit 3 of the ring which was the first candidate as the empty housing unit 3, and processing returns to step 2. The data of the inventory memory 14 rewritten at this time is used for the next housing operation.

The procedures of steps 2 to 5 can be repeated any number of times as occasion demands and the second ring holding means 9b is exactly moved to the position fronting on the part housing unit 3 that houses a metal ring W provided with the optimum size data in accordance with preset combination conditions. The state in which the second ring holding means 9b is moved to the position fronting on the part housing unit 3 that houses the metal ring W is shown typically in FIG. 12(a).

In step 3, if the driving control means 11 receives an ON detection signal from the first sensor 12b and it is checked that the metal ring W is actually housed in the part housing unit 3 on which the second ring holding means 9b fronts, the housing or extracting controller 6, subsequently, in step 6, drives the rodless cylinder 32 by the driving control means 11, advances the second ring holding means 9b, and advance it into the part housing unit 3.

The second ring holding means 9b, in step 7, is made to advance until the limit switch 40b turns on. Further, if the limit switch 40b turns on, subsequently, the housing or extracting controller 6, in step 8, as shown in FIG. 5(a) by the driving control means 11, retreats the cylinder rod 57 by the cylinder 54 of the link mechanism 51 and makes the intervals of the arm members 35a, 35b of the ring holding member 9a narrower than the intervals of the holding members 45a, 45b of the part housing unit 3. Consequently, a metal ring W held in the holding members 45a, 45b is inserted in the insertion members 39a, 39b from the peripheral side and held in the second ring holding member 9b. This state is typically shown in FIG. 12(b).

Subsequently, the housing or extracting controller 6, in step 9, drives the rodless cylinder 32 by the driving control means 11 and retreats the second ring holding means 32 with a metal ring W held as is. The second ring holding means 9b, in step 10, is made to retreat until the control switch 40a turns on, returns to the position fronting on the part housing unit 3, and extracts the metal W from the part housing unit 3. This state is typically shown in FIG. 12(c).

If the second ring holding means 9b returns to the position fronting on the part housing unit 3, the housing or extracting controller 6, subsequently, checks whether the second ring holding means 9b holds a metal ring W by the second sensor 13b or not.

The second sensor 13b has the same configuration as the second sensor 13a and operates in the same manner as the second sensor 13a. That is, the second sensor 13b, as shown typically in FIG. 12, consists of a tip second sensor 13b₁ that detects a metal ring W at the tip of the second ring holding means 9b and a back end second sensor 13b₂ that detects a metal ring W at the back end of the second ring holding means 9b. Both the tip second sensor 13b₁ and the back end second sensor 13b₂ are transmission type optical sensors and consist of a pair of light emitting and light reception units. Both the tip second sensor 13b₁ and the back end second sensor 13b₂ turn off (no metal ring W exists) when light emitted from the light emitting unit is incident on the light reception unit and turn on (a metal ring W exists) when the light is not incident on the light reception unit, and output a detection signal to the driving control means 11.

Thereupon, the driving control means 11 sends a detection signal input from the tip second sensor 13b₁ and the back end second sensor 13b₂ to the error deciding means 20 and decides whether housing operation is terminated normally or not when the limit switch 40a turns on and the second ring holding means 9b returns to the position fronting on the part housing unit 3. That is, in step 11, if the ON of the back end second sensor 13b₂ is detected and in step 12, if the ON of the tip second sensor 13b₂ is detected, as shown in FIG. 12(c), the second ring holding means 9b holds a metal ring W. Accordingly, the error deciding means 20 decides that the housing operation is terminated normally. Subsequently, the housing or extracting controller 6, in step 13, conveys the metal ring W extracted by the ring extracting or conveying means 5b to the next process and completes extracting operation.

On the other hand, in step 11, when the OFF of the back end second sensor 13b₂ is detected, as shown in FIG. (d), the first ring holding means 9a will not hold a metal ring W. Subsequently, the error deciding means 20 decides that an error exists, and in step 14, stops the entirety of the part housing or extracting apparatus 1 by operating the stopping means 21 and stopping the driving control means 11 due to an error.

Accordingly, the part housing or extracting apparatus 1 of the present embodiment can smoothly perform the housing operation and extracting operation of a metal ring W even when the state of the part housing unit 3 the inventory memory 14 and the housing data memory 15 store and the state of the actual part housing unit 3 differ. Further, the part housing or extracting apparatus 1 of the present embodiment can prevent confusion by immediately stopping the driving control means due to an error when an error is recognized in the housing operation or extracting operation.

Figure 13:
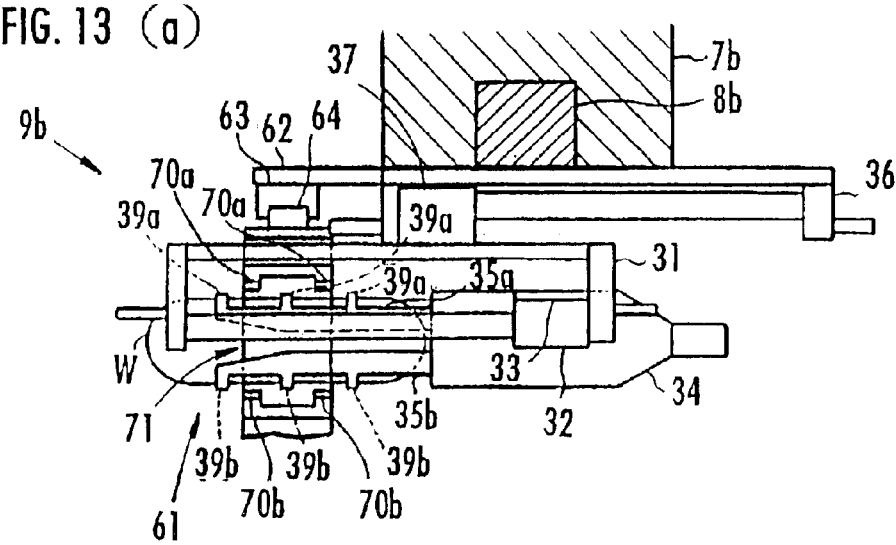
FIG. 13 is a top view showing the configuration and operation of another embodiment in the part housing or extracting apparatus of the present invention in the apparatus shown in FIG. 1.
Figure 13:
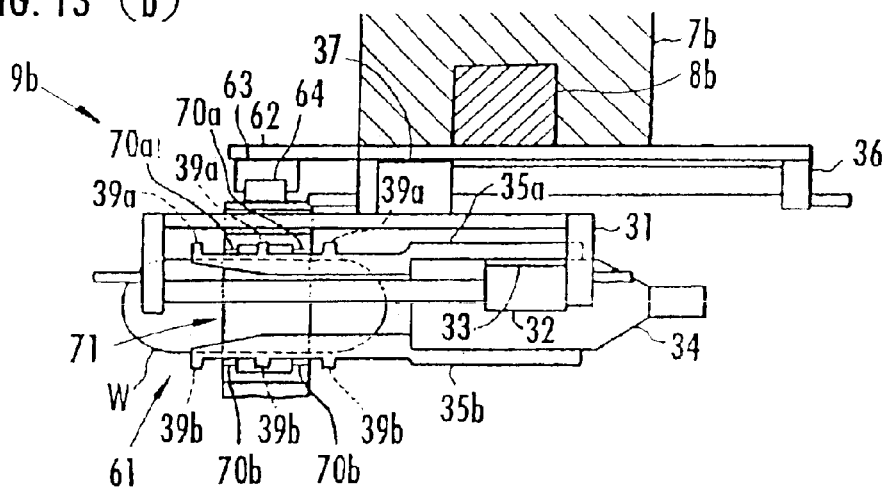
Figure 13:
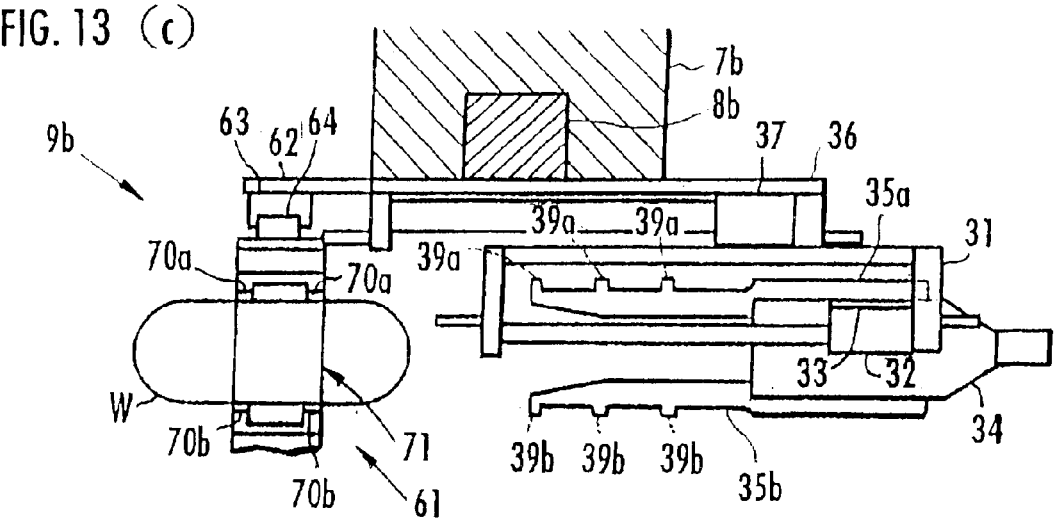

Further, the part housing or extracting apparatus 1 of the present embodiment, as shown in FIG. 13, may be provided with a temporary housing member 61 that temporarily houses a plurality of metal rings W inserted and extracted by the insertion members 39a, 39b in the second ring holding means 9b.

Figure 14:
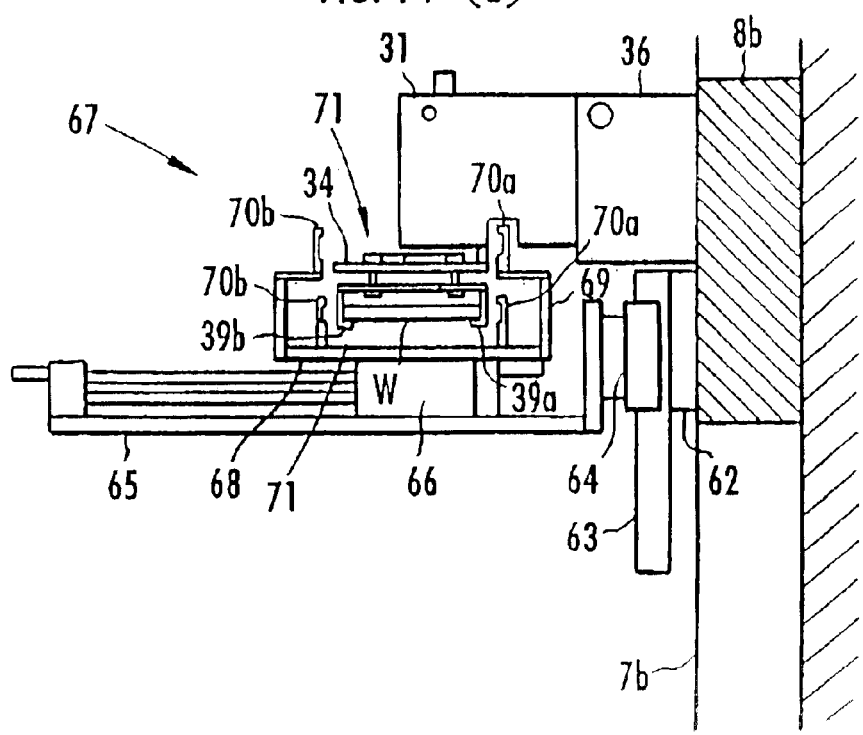
FIG. 14 is a side view of the apparatus shown in FIG. 13.
Figure 14:
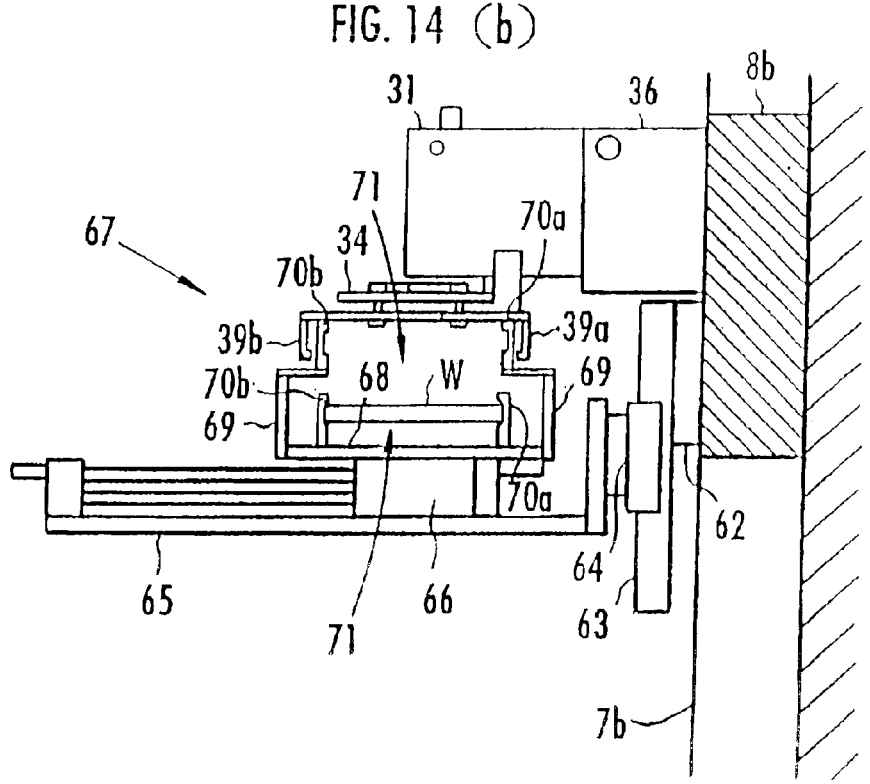

The temporary housing member 61, as shown in FIGS. 13(a) and 14(a), synchronizes with the second ring holding means 9b and freely moves vertically by being mounted on the vertical moving means 8b via a supporting member 62. Further, the temporary housing member 61 is provided with a strut 63 mounted on the supporting member 62 in parallel to the columnar member 7b and a lifter 64 and is freely lifted by the lifter 64 along the strut 63. As a result, the temporary housing member 61 is freely lifted against the arm members 35a, 35b.

Further, the temporary housing member 61 is provided with a rodless cylinder 66 provided in a U-shaped member 65 that is supported by the lifter 64 and a magazine unit 67 mounted on the rodless cylinder 66. The magazine unit 67 is provided with a bottom plate 68 mounted on the rodless cylinder 66 and a wall plate 69 that is erected in an inversely L-shaped form on both sides of the bottom plates 68 along the moving direction of the rodless cylinder 66. A temporary housing unit 71 with two sets of holding members 70a, 70b opposed to each other at intermediate intervals between when the intervals of the holding members 39a, 39b of the second ring holding means 9b are most shortened and when most expanded is formed between the wall plates 69 on the bottom plate 68. Subsequently, in the temporary housing unit, the arm members 35a, 35b of the second ring holding means 9b and the substrate 34 provided with the link mechanism 51 (not shown) are freely inserted.

Further, the temporary housing unit 71 provided with the two sets holding members 70a, 70b opposed to each other at the same interval as the holding members 70a, 70b is formed on the top of the wall plate 69. Accordingly, the temporary housing unit 71 is provided up and down in two stages so that two adjacent metal rings W can be housed among metal rings W that constitute a laminated ring. The holding members 70a, 70b provided in each of the temporary housing units 70 are arranged so as to be positioned between the three sets of insertion members 39a, 39b provided in the arm members 35a, 35b in a condition where the second ring holding means 9b retreats from the part housing unit 3 (not shown) as described above.

In the second ring holding means 9b provided with the temporary housing member 61, when a metal ring W is extracted as described above, as shown in FIG. 14(a), first, the arm members 35a, 35b are inserted in the temporary housing unit 71 at the lower stage side. At this time, the intervals of the insertion members 35a, 35b, as shown in FIG. 13(a), are made smaller than the intervals of the holding members 70a, 70b provided in the temporary housing unit 71.

Next, the intervals of the insertion members 35a, 35b are made wider than the intervals of the holding members 70a, 70b by operating the link mechanism 51 shown in FIG. 5. Hereupon, as shown in FIG. 13(b), for a metal ring W, insertion by the insertion members 35a, 35b is released. Then the metal ring W is inserted and held in the holding members 70a, 70b provided at the position where it does not interfere with the insertion members 35a, 35b at narrower intervals than the intervals of the expanded insertion members 35a, 35b instead.

Next, as shown in FIG. 13(c), when the arm members 35a, 35b are retreated by the rodless cylinder 37, a metal ring W is left in the temporary housing unit 71 in a condition where it is inserted and held in the holding members 70a, 70b and temporary housing is completed against the temporary housing unit 71 at the lower stage.

In the second ring holding means 9b provided with the temporary housing member 61, subsequently, as shown in FIG. 14(b), the lifter 64 is let to descend and the magazine unit 67 is moved downward via the U-shaped member 65 and the rodless cylinder 66. Accordingly, the arm members 35a, 35b can be inserted to the temporary housing unit 71 at the upper stage.

Thereupon, next, a metal ring W can also be housed in the temporary housing unit at the upper stage by extracting the metal ring as described above and repeating the operations of FIGS. 13(a) to (c). If the metal ring W is temporarily housed in the upper and lower housing units 71, as shown in FIG. 13(c), the arm members 35a, 35b, in a state in which they recede from the temporary housing unit 71 moves the magazine unit 67 to the direction where it is separated from the columnar member 7b by the rodless cylinder 66 shown in FIG. 14 and conveys two metal rings W temporarily housed in the temporary housing unit 71 to the next process.

At this time, it is desirable that a detection means which detects that the predetermined number of metal rings W (two for this case) are temporarily housed in the temporary housing member 61 so that the predetermined number of metal rings W can exactly be laminated in the next process. As the detection means, a photoelectric sensor that detects the presence of a metal ring W may also be provided in each of the temporary housing units 71, and a metering sensor that detects that the predetermined number of metal rings W is temporarily housed may also be provided by measuring the total weight of the temporary housing member 61 or the magazine unit 67.

Further, in the present embodiment, the temporary housing unit 71 is provided in the temporary housing member 61 up and down in two stages and two metal rings W are temporarily housed. However, the temporary housing unit 71 having a plurality of stages may also be provided by mutually laminating a plurality of wall plates 69 on the wall plate 69. It is desirable that the number of stages of the temporary housing unit 71 should be the total number or half number of metal rings W that forms a laminated ring, for example, in order to increase conveyance efficiency and simplify lamination in the next process.

Further, in the present embodiment, a metal ring W is temporarily housed sequentially from the temporary housing unit 71 at the lower stage side so that the rodless cylinder 32 that advances or retreats the arm members 35a, 35b cannot interfere with a metal ring W that is already temporarily housed. However, in the order in which the laminated ring is constituted, when the metal ring W housed in the temporary housing unit 71 at the upper stage is at the position nearer to the second ring conveying means 9b in the housing shelf 4, if it is temporarily housed sequentially from the temporary housing unit 71 at the lower stage, a problem arises that the moving distance of the second ring conveying means 9b from the housing shelf 4 increases. This problem becomes remarkable as the number of stages of the temporary housing unit 71 increases.

Thereupon, in the part housing or extracting apparatus 1 of the present embodiment, it is desirable that the second ring holding means 9b should be provided with extended arm members 72a, 72b, as shown in FIG. 15(a), instead of the arm members 35a, 35b shown in FIG. 13. Except that the second ring holding means 9b shown in FIG. 15(a) are provided with the extended arm members 72a, 72b, they are provided with entirely the same configuration as the second ring holding means 9b shown in FIG. 13 and are mounted on the rodless cylinder 32 via the hanging member 33, and the arm members 72a, 72b are provided in the advance or retreat direction of the rodless cylinder 32. Further, the arm members 72a, 72b are provided with three pairs of insertion members 39a, 39b at the tip.

Figure 15:
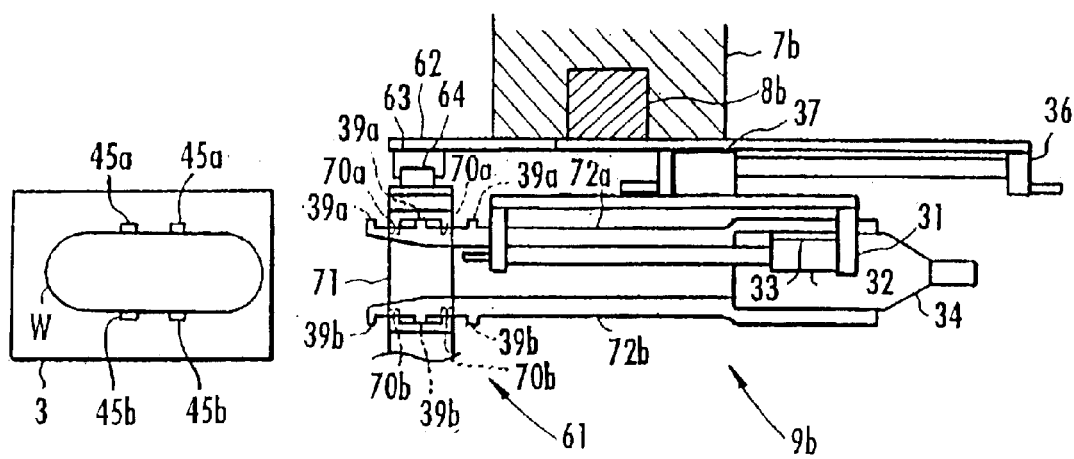
FIG. 15 is a top view showing the configuration and operation of another embodiment of the apparatus shown in FIG. 13.
Figure 15:
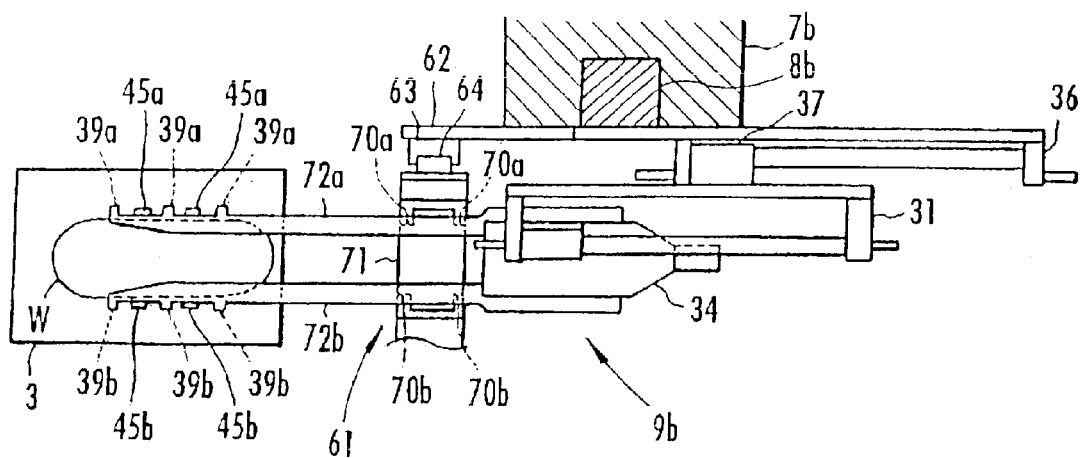

Because the second ring holding means 9b is provided with the expanded arm members 72a, 72b, as shown in FIG. 15(b), the rodless cylinder 32 positioned at the back end of the arm members 72a, 72b will not invade into the temporary housing unit 71, but advances into the part housing unit 3 via the temporary housing unit 71. Accordingly, a metal ring W held in the holding members 45a, 45b of the part housing unit 3 can be inserted. Besides, the part housing unit 3 has the same configuration as FIG. 4, and FIG. 15 typically shows the configuration.

Accordingly, the second ring holding means 9b shown in FIG. 15 can temporarily house a metal ring W in the temporary housing unit 71 at the lower stage without making the rodless cylinder 32 interfere with the metal ring W even if the metal ring W is already housed temporarily in the temporary housing unit 71 at the upper stage when the metal ring W held in the holding members 45a, 45b of the part housing unit 3 is extracted.

Figure 16:
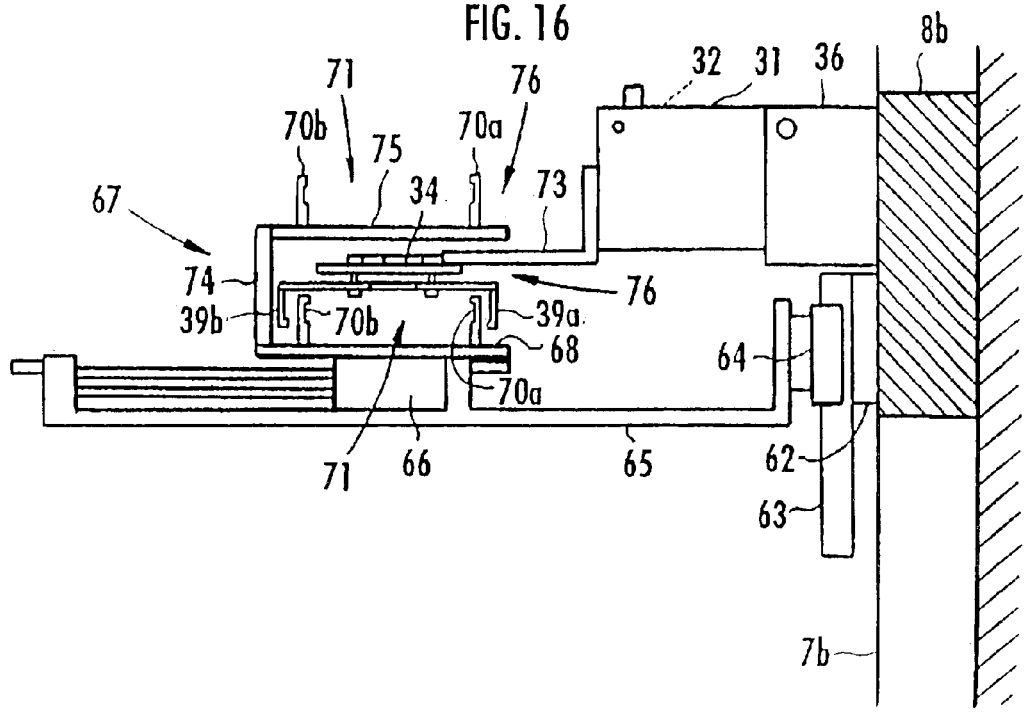
FIG. 16 is a side view showing the configuration of another further embodiment of the apparatus shown in FIG. 13.

Further, in the part housing or extracting apparatus 1 of the present embodiment, the second ring holding means 9b may also be hung at the tip of an L-shaped overhanging member 73 overhanging so as to cross at right angles the advance or retreat direction from the side of the rodless cylinder 32 via the substrate 34 as shown in FIG. 16, except for comprising the arm members 72a, 72b extended as shown in FIG. 15.

In this case, the magazine unit 67 is provided with a supporting member 74 that erects at the end of the reverse side with the rodless cylinder 32 of the bottom plate 68 mounted on the rodless cylinder 66 and a shelf plate 75 that covers the top of the holding members 70a, 70b provided on the bottom plate 68 is provided on the supporting member 74. The holding members 70a, 70b are provided on the shelf plate 75 and the temporary housing unit 71 is formed up and down in two stages together with the holding members 70a, 70b provided on the bottom plate 68.

The temporary housing unit 71 freely inserts the arm members 35a, 35b of the second ring holding means 9b and the substrate 34, the side fronting on the rod cylinder 32 forms an opening 76 between the bottom plate 68 and the shelf plate 75 and on the top of the shelf plate 75, and the overhanging member 73 freely passes through the opening. Besides, the second ring holding means 9b shown in FIG. 16 has entirely the same configuration as the second ring holding means 9b shown in FIG. 13 except that the configuration in which the substrate 34 is hung in the overhanging member 73 is provided.

Figure 17:
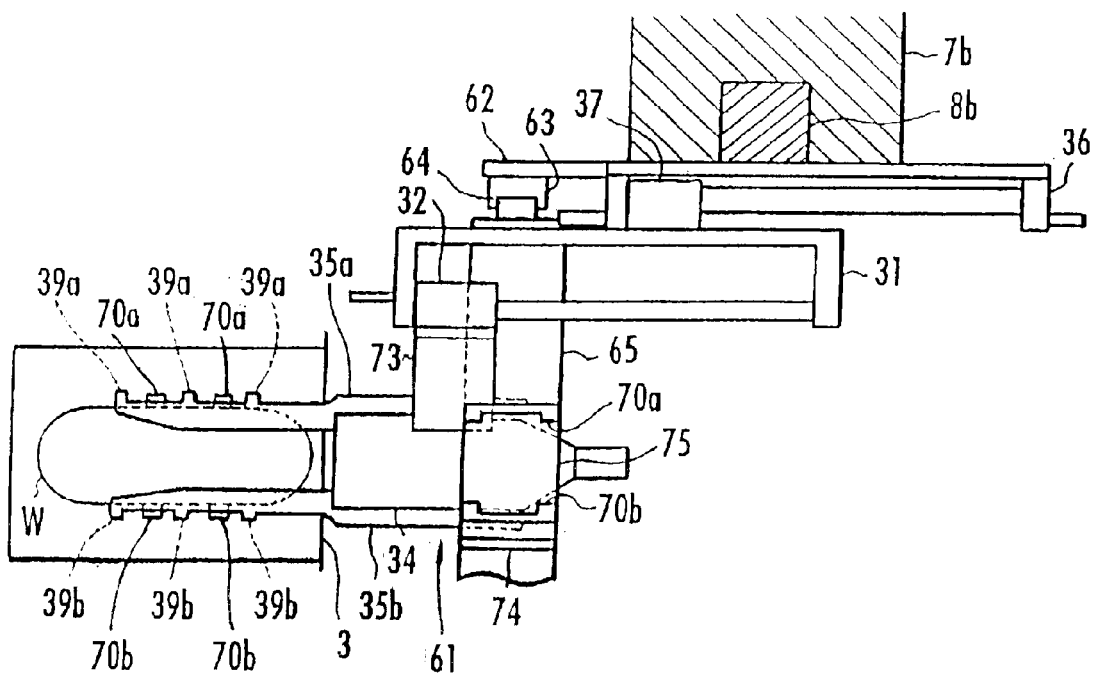
FIG. 17 is a top view showing the operation of the embodiment shown in FIG. 16.

According to the second ring holding means 9b, because the substrate 34 is hung in the overhanging member 73, as shown in FIG. 17, the rodless cylinder 32 is positioned at the side of the arm members 35a, 35b and will not invade into the temporary housing unit 71. On the other hand, the arm members 35a, 35b advances into the part housing unit 3 via the temporary housing unit 71 and can insert a metal ring W held in the holding members 45a, 45b of the part housing unit 3. Besides, the part housing unit 3 has the same configuration as FIG. 4, and FIG. 17 typically shows the configuration.

Consequently, the second ring holding means 9b shown in FIGS. 16 and 17 can temporarily house a metal ring W in the temporary housing ring 71 at the lower stage without making the rodless cylinder 32 interfere with the metal ring W even if the metal ring W is already housed temporarily in the temporary housing unit 71 at the upper stage when the metal ring W held in the holding members 45a, 45b of the part housing unit 3 is extracted.

As described above, according to the configuration shown in FIGS. 15 and 17, the metal ring W housed in the part housing unit 3 can sequentially be extracted from the position near to the second ring holding means 9b regardless of the order in which the laminated ring is formed, and when the ring is temporarily housed in the temporary member 61, it can temporarily be housed in the temporary housing unit 71 defined in accordance with the order in which the laminated ring is formed regardless of the temporary housing units at the upper and lower stages.

Besides, in the present embodiment, the case where the ring housing or conveying means 5a and the ring housing or conveying means 5b are secured and the cylindrical bodies 2a, 2b rotate and move is described. However, the ring housing or conveying means 5a and the ring housing or conveying means 5b may also move along the external surface of the secured cylindrical bodies 2a, 2b secured. Further, both the ring housing or conveying means 5a, 5b and the cylindrical bodies 2a, 2b may also be able to move.

Further, in the present embodiment, the case where one each of the ring housing or conveying means 5a and the ring housing or conveying means 5b is provided is described, but a plurality of housing or conveying means 5a, 5b may also be provided.

Moreover, in the present embodiment, the case where the two cylindrical bodies 2a, 2b are provided with the part housing unit 3 in a plurality of stages is described, but the cylindrical bodies may be provided with at least one stage of the part housing unit 3, and many cylindrical bodies themselves may also be disposed because it is not limited to two.

Industrial Applicability

A part housing or extracting apparatus can be used for an application in which, for example, a metal ring that forms a material of a metal belt for a continuously variable transmission is housed, and is extracted in accordance with predetermined conditions.

What is claimed is:

1. A part housing or extracting apparatus comprising:
a housing shelf which has a plurality of cylindrical bodies coaxially laminated in a vertical direction and equipped with at least one stage of a part housing unit, the peripheral edge of which is partitioned into many columns so that the outer peripheral edge surface of the part housing unit may be opened, the respective cylindrical bodies being independently rotatable;
at least one part housing or conveying means which has first part holding means for holding a part disposed opposite to the outer peripheral surface of the housing shelf, and conveying the part held by the first part holding means to a predetermined part housing unit and then housing therein; and
at least one part extracting or conveying means which has second part holding means for holding the part disposed opposite to the outer peripheral surface of the housing shelf, and holding and extracting the part housed in the predetermined part housing unit by the second part housing means and then conveying to a predetermined position;
the respective cylindrical bodies and the respective part holding means being relatively movable along the outer peripheral surface of the housing shelf, wherein
the part is an elastic ring and is used to form a laminated ring by mutually laminating the rings in accordance with a predetermined condition;
the part housing unit comprises a plurality of pairs of first holding members oppositely arranged at predetermined intervals; each pair of the first holding members are mutually arranged in columns at predetermined intervals and held from the outer peripheral edge surface of the ring in a condition where the ring is bent;
both the part holding means further comprise a pair of arm members oppositely arranged at predetermined intervals, advance or retreat means for advancing or retreating the arm members to and from the part housing unit, a plurality of pairs of clasp members oppositely disposed in the arm members at predetermined intervals along the lengthwise direction of the arm members, and expanding or shortening means for expanding or shortening the intervals of the clasp members;
when the arm members are advanced into the part housing unit by the advance or retreat means, the first holding members are arranged so as to be positioned between the clasp members, and the expanding or shortening means reduces the intervals of the clasp members advanced into the part housing unit so as to be narrower than the intervals of the first holding members and clasps the ring from the outer peripheral edge surface or enlarges the intervals of the clasp members so as to be wider than the intervals of the first holding members, thereby releasing the clasp of the ring.

2. A part housing or extracting apparatus according to claim 1 which further comprises:
an inventory memory for storing presence/absence of inventory of the part in each part housing unit;
a housing data memory for storing inherent data of the part in connection with a position in the housing shelf of the part housing unit wherein the part is housed; and a housing or extracting controller for controlling a housing operation of directing the first part holding means to the empty part housing unit stored by the inventory memory and housing the part in the part housing unit by the first part holding means, and an extracting operation of directing the second part holding means to the part housing unit housing the part to be extracted stored in the housing data memory and holding and then extracting the part from the part housing unit by the second part holding means.

3. A part housing or extracting apparatus according to claim 2, wherein said housing or extracting controller further comprises a first selecting means which selects an empty part housing unit of a first candidate and an empty part housing unit of a subsequent candidate in the order near to the position of the first part holding unit in accordance with the position of the empty part housing unit and the position of the first part holding means stored in the inventory memory in the housing operation.

4. A part housing or extracting apparatus according to claim 2, wherein the second part holding means comprises a first sensor for detecting presence/absence of the part in the part housing unit and a second sensor for detecting the holding of the part when the second part holding means is allowed to front on the part housing unit; and the part housing or extracting apparatus further comprises subsequent candidate position setting means for setting the position of the part housing unit of the subsequent candidate part stored by the housing data memory to allow the second part holding means to front on the part housing unit of the subsequent candidate, when the second part holding means is allowed to front on a part housing unit of a first candidate part which the housing data memory stores by the extracting operation, and when it is detected by the first sensor that the part housing unit of the first candidate part is empty;

error deciding means for detecting presence/absence of a part held by the second part holding means with the aid of a second sensor after the end of the extracting operation to decide presence/absence of an error in the extracting operation; and stopping means for stopping each operation when it is decided by the error deciding means that the error is present.

5. A part housing or extracting apparatus according to claim 2, further comprising a second selecting means for selecting a part housing unit of a first candidate part and a part housing unit of a subsequent candidate part in order suitable as the part to be extracted in accordance with the inherent data of the part stored in the housing data memory during the extracting operation.

6. A part housing or extracting apparatus according to claim 2, wherein the housing or extracting controller further comprises storage updating means for updating the inventory memory in accordance with a detection result of the part in the part housing unit by the first sensor, and the storage of the inventory memory updated by the storage updating means is used for the subsequent housing operation.

7. A part housing or extracting apparatus according to claim 2, wherein said first part holding means comprises a first sensor for detecting presence/absence of the part in the part housing unit when it fronts on the part housing unit, and a second sensor for detecting the holding of the part;

said housing or extracting controller comprises subsequent candidate position setting means for setting the position of an empty part housing unit of a subsequent candidate stored in the inventory memory to allow the first part holding means to front on the empty part housing unit of the subsequent candidate, when the first part holding means is allowed to front on the empty part housing unit of a first candidate stored in the inventory memory by the housing operation, and when the part is detected in the empty part housing unit of the first candidate by the first sensor;

error deciding means for detecting presence/absence of the part held by the first part holding means with the aid of a second sensor after the end of the housing operation to decide presence/absence of an error in the housing operation; and stopping means for stopping each operation when it is decided by the error deciding means that the error is present.

8. A part housing or extracting apparatus according to claim 7, wherein the second sensor comprises a tip sensor for detecting presence/absence of the ring held by the first or second part holding means at a ring tip opposed to the part housing unit when the ring is normally clasped by the clasp member, and a back end sensor for detecting it at a ring back end on the side opposite to the housing unit.

9. A part housing or extracting apparatus according to claim 1, wherein the second part holding means further comprises a temporary housing member for temporarily housing a plurality of rings clasped and extracted by the clasp members when it retreats from the part housing unit to convey the temporary housing member housing the plurality of rings to the next process.

10. A part housing or extracting apparatus according to claim 9, wherein the temporary housing member further comprises means for detecting that the rings are temporarily housed in all the temporary housing units.

11. A part housing or extracting apparatus according to claim 9, wherein the temporary housing member is provided so as to be relatively ascendable and descendable to the arm members which are insertable; the temporary housing member comprises the temporary housing units for temporarily housing the rings in a multi-stage form; and the arm members temporarily house the rings extracted by the clasp members in such an order as to constitute the laminated ring.

12. A part housing or extracting apparatus according to claim 11, wherein the second part holding means is mounted on the advance or retreat means is parallel with the advance or retreat direction; and the temporary housing unit has an opening through which the second part holding means mounted on the advance or retreat means can pass.

13. A part housing or extracting apparatus according to claim 11, wherein the temporary housing unit comprises a plurality of pairs of second holding members oppositely arranged at predetermined intervals;

each pair of the second holding members is arranged in the form of columns mutually at predetermined intervals and holds the ring from its outer peripheral side in a condition where the ring is bent; and when the arm members are retreated into the temporary housing unit by the advance or retreat means, the second holding member is arranged so as to be positioned between the clasp members.

14. A part housing or extracting apparatus according to claim 11, wherein the second part holding means is mounted on the advance or retreat means; and the arm members are provided in the advance or retreat direction of the advance or retreat means, advances into the part housing unit through the temporary housing unit, and has a length which permits the ring housed in the part housing unit to be inserted into the insertion members.

* * * * *

UNITED STATES PATENT AND TRADEMARK OFFICE
CERTIFICATE OF CORRECTION

PATENT NO. : 6,845,291 B2  
DATED : January 18, 2005  
INVENTOR(S) : Hiroki Tahira et al.

Page 1 of 1

It is certified that error appears in the above-identified patent and that said Letters Patent is hereby corrected as shown below:

<u>Title page,</u>  
Item [30], Foreign Application Priority Data, please also list:  
-- June 11, 2001 (JP) 2001-175045 --

Signed and Sealed this

Seventeenth Day of May, 2005

JON W. DUDAS  
*Director of the United States Patent and Trademark Office*